United States Patent
Nibe

(10) Patent No.: US 8,463,311 B2
(45) Date of Patent: Jun. 11, 2013

(54) MOBILE TERMINAL AND POWER CONTROL METHOD

(75) Inventor: Keiji Nibe, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 340 days.

(21) Appl. No.: 12/785,901

(22) Filed: May 24, 2010

(65) Prior Publication Data

US 2011/0218012 A1  Sep. 8, 2011

(30) Foreign Application Priority Data

Mar. 5, 2010 (JP) .................................. 2010-048687

(51) Int. Cl.
*H04B 7/00* (2006.01)
(52) U.S. Cl.
USPC ............. 455/522; 455/67.11; 455/68; 455/69
(58) Field of Classification Search
USPC ............... 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

| | | | | |
|---|---|---|---|---|
| 5,903,841 | A * | 5/1999 | Kondo ........................... | 455/436 |
| 2001/0017882 | A1* | 8/2001 | Umeda et al. .................. | 375/130 |
| 2002/0016177 | A1* | 2/2002 | Miya et al. ..................... | 455/522 |
| 2002/0018453 | A1* | 2/2002 | Yu et al. ......................... | 370/333 |
| 2003/0112851 | A1* | 6/2003 | Aust et al. ...................... | 375/141 |
| 2005/0047427 | A1* | 3/2005 | Kashima et al. ............... | 370/441 |
| 2005/0079886 | A1* | 4/2005 | Niwano .......................... | 455/522 |
| 2006/0099915 | A1* | 5/2006 | Laroia et al. ................... | 455/101 |
| 2007/0010277 | A1* | 1/2007 | Sato et al. ....................... | 455/522 |
| 2007/0117582 | A1* | 5/2007 | Ohkubo et al. ................ | 455/522 |
| 2008/0151832 | A1* | 6/2008 | Iwasaki .......................... | 370/330 |

FOREIGN PATENT DOCUMENTS

| | | |
|---|---|---|
| EP | 1 215 926 | 6/2002 |
| EP | 1 513 282 | 3/2005 |
| EP | 1 901 440 | 3/2008 |
| EP | 2 009 818 | 12/2008 |
| WO | 2009/084091 | 7/2009 |

OTHER PUBLICATIONS

Extended European Search Report issued for corresponding European Patent Application No. 10163704.9, dated Jun. 17, 2011.
3GPP TS 25.211 V6.10.0 (Sep. 2009); 5.3.2.4 "E-DCH Relative Grant Channel"; Dated Sep. 2009.
3GPP TS 25.212 V6.10.0 (Dec. 2006); "Mapping for E-RGCH Relative Grand"; Dated Dec. 2006.

* cited by examiner

*Primary Examiner* — Dominic E Rego
(74) *Attorney, Agent, or Firm* — Myers Wolin, LLC

(57) ABSTRACT

A mobile terminal includes a receiving part configured to receive from a base station a reception signal including a control signal used for controlling transmission power; a comparing part configured to compare a correlation value, which is obtained from the control signal included in the reception signal and a first unique signal, with a threshold; a control part configured to control the transmission power based on a comparison result of the comparing part; and a threshold generating part configured to change the threshold according to a reception environment.

19 Claims, 27 Drawing Sheets

|  | 1 PATH | MULTIPATH |
|---|---|---|
| THRESHOLD | T1 | T2 |

MOBILE TERMINAL AND POWER CONTROL METHOD

CROSS-REFERENCE TO RELATED APPLICATIONS

This application is based upon and claims the benefit of priority of the prior Japanese Patent Application No. 2010-048687, filed on Mar. 5, 2010, the entire contents of which are incorporated herein by reference.

FIELD

The embodiment discussed herein is directed to a mobile terminal that carries out radio communication, and, for example, to a mobile terminal that carries out radio communication according to W-CDMA Wideband-Code Division Multiple Access).

BACKGROUND

W-CDMA is a radio communication interface prescribed in IMT-2000 (International Mobile Telecommunications-2000), and is placed as the most mainstream of radio communication systems. According to W-CDMA, a maximum transmission rate of 384 kbps is used, and therewith, multimedia access such as that of voice, moving pictures, data and so forth is available.

Recently, research and development of radio communication systems called HSDPA (High Speed Downlink Packet Access) and HSUPA (High Speed Uplink Packet Access) based on the art of W-CDMA have been proceeding.

FIG. 1 illustrates HSUPA communication. Here, uplink transmission from UE (User Equipment) to a base station is carried out in HSUPA communication. The UE transmits SI (Scheduling Information) to the base station as an uplink data transmission request. In the SI, information concerning transmission data the UE sends is mapped. For example, in the SI, information of "the highest-priority logical channel ID", "a total amount of data for logical channels", "a data amount for the highest-priority logical channel" and "transmission power with which the UE can carry out transmission" is mapped. In FIG. 1, BS denotes the base station; the above-mentioned SI denotes an uplink data scheduling request; E-DPCCH denotes uplink control information; E-DPDCH denotes uplink data; E-AGCH denotes highest permitted transmission power; E-RGCH denotes transmission power Up/Down/Hold control; and E-HICH denotes Ack/Nack signal for E-DPDCH.

In the above-mentioned uplink E-DPCCH (E-DCH Dedicated Physical Control Channel), information concerning uplink data is mapped, and E-TFCI (E-DCH Transport Format Combination Indicator), RSN (Retransmission Sequence Number) and Happybit are mapped there.

The base station totals up plural SI items transmitted from the UE, and carries out scheduling to determine transmission timing of the UE that carries out uplink transmission based on communication quality of the UE, a priority of uplink data or such. After carrying out the scheduling, the base station transmits a Grant to the UE as uplink transmission permission. The Grant has two types, i.e., an absolute grant and a relative grant. The absolute grant is transmitted via the above-mentioned downlink E-AGCH (E-DCH Absolute Grant Channel). The base station notifies each UE of highest power that the UE is permitted to transmit. The relative grant is transmitted via the above-mentioned downlink E-RGCH (E-DCH Relative Grant Channel). The base station notifies each UE of whether the UE increases, decreases or holds power to transmit with respect to current transmission power as a signal component of "Up (increase), Down (decrease) or Hold (hold)".

The UE can carry out high-speed uplink access by transmitting user information to the base station by using an individual channel called E-DCH (Enhanced Dedicated Channel) after being permitted to carry out uplink transmission based on the Grant. In a HSUPA system, retransmission control is carried out the same as that in the HSDPA system, and the UE receives ACK or NACK information for the E-DCH via the above-mentioned downlink E-HICH (E-DCH HARQ Acknowledgement Indicator Channel).

In the HSUPA system, the base station provides instructions to the UE that requests uplink transmission such that reception power of the E-DCH in the base station has a desired throughput by using the signal component of the E-RGCH "Up, Down or Hold" to provide instructions to increase, hold or decrease transmission power. The UE determines the transmission power of the uplink E-DCH according to the "Up, Down or Hold" signal of the E-RGCH. The E-RGCH is transmitted by the base station having been multiplied by a signature pattern that is unique to the E-RGCH. The UE calculates a correlation value between the signature pattern unique to the E-RGCH and the received E-RGCH signal, and thus, determines which one of Commands of Table 1 the E-RGCH is transmitted with:

TABLE 1

| Command | E-RGCH value |
|---------|--------------|
| Up      | +1           |
| Hold    | 0            |
| Down    | −1           |

There, the UE compares the E-RGCH correlation value with a threshold to determine "Up, Down or Hold". For example, the following E-RGCH signal determining conditions are used:

UP: $C_{E\text{-}RGCH} > Th$

DOWN: $C_{E\text{-}RGCH} < -Th$

Hold: $-Th \leq C_{E\text{-}RGCH} \leq Th$ $C_{E\text{-}RGCH}$ denotes the correlation value between the received E-RGCH and the E-RGCH signature pattern. Th denotes the threshold for E-RGCH. The threshold Th is set, for example, to be an appropriate value based on an experiment or such before the shipment of a mobile terminal.

NON-PATENT DOCUMENT

NON-PATENT DOCUMENT 1: 3GPP TS 25.211, 5.3.2.4 E-DCH Relative Grant Channel

NON-PATENT DOCUMENT 2: 3GPP TS 25.212, Mapping for E RGCH Relative Grant

The threshold Th is, for example, a value previously set so that, even if in a not good reception environment, Up or Down or Hold can be identified. In a not good reception environment, the correlation value between the received E-RGCH signal and the signature pattern unique to the E-RGCH becomes smaller, and a smaller value may be preferably set as the threshold so that Up, Down or Hold can be identified even by using the smaller correlation value. FIG. 2 depicts one example of the correlation value and the thresholds in such a not good reception environment. As depicted in FIG. 2, in a not good reception environment, the correlation value with the E-RGCH signature pattern becomes smaller, and therefore, the thresholds A and B (i.e., +Th and −Th, respectively) depicted in FIG. 2 are set to have smaller absolute values. Below, it is assumed that the absolute values of the thresholds A and B are the same as one another. However, the absolute values of the thresholds A and B may be different from one another.

The Hold signal of the E-RGCH has a non-transmitted state, and thus, a correlation with the signature pattern becomes smaller accordingly. However, the non-transmitted state has a random pattern, and the correlation between the random pattern and the signature may become somewhat stronger in some cases. In such a case, even in the non-transmitted state, the correlation value of the E-RGCH may increase to be more than the threshold, and an erroneous determination may be made as Up or Down. Below, specific examples will be described.

FIG. 3 depicts one example of the correlation value and the thresholds in a good reception environment. As depicted in FIG. 3, in a case of a good reception environment, the correlation value of the Up signal comes to have a value near to 1, and the correlation value of the Down signal comes to have a value near to −1. The Hold signal has a random pattern, and therefore, the correlation value of the Hold signal comes to have a value near to 0. However, as the correlation A depicted in FIG. 3, the correlation value of the Hold signal may have the correlation value that becomes somewhat strong. This correlation value is equal to or more than the threshold A, and thus, the signal component of the E-RGCH that is originally Hold is erroneously determined as Up.

Thus, in the HSUPA system, even in a case where a communication rate is satisfactory, a signal determination for the E-RGCH may be erroneous, and thereby, an appropriate setting of transmission power may not be carried out. As a result, transmission power may be set lower so that a throughput degrades, or transmission power may be set higher so that excessive power is transmitted and interference received by other mobile terminals increases, resulting in a degradation in a system throughput.

SUMMARY

In one aspect of the embodiments, a mobile terminal includes a receiving part configured to receive from a base station a reception signal including a control signal used for controlling transmission power; a comparing part configured to compare a correlation value, which is obtained from the control signal included in the reception signal and a first unique signal, with a threshold; a control part configured to control the transmission power based on a comparison result of the comparing part; and a threshold generating part configured to change the threshold according to a reception environment.

In another aspect of the embodiments, a power control method in a mobile terminal includes receiving, from a base station, a reception signal including a control signal used for controlling transmission power; changing, according to a reception environment, a threshold used for comparing with a correlation value that is obtained from the control signal included in the reception signal and a first unique signal; comparing the correlation value with the changed threshold; and controlling the transmission power based on a comparison result.

The object and advantages of the disclosure will be realized and attained by means of the elements and combinations particularly pointed out in the claims.

It is to be understood that both the foregoing general description and the following detailed description are exemplary and explanatory and are not restrictive of the invention as claimed.

DESCRIPTION OF EMBODIMENTS

Below, the embodiments will be described with reference to the figures.

[Embodiment 1]

Figure 1:
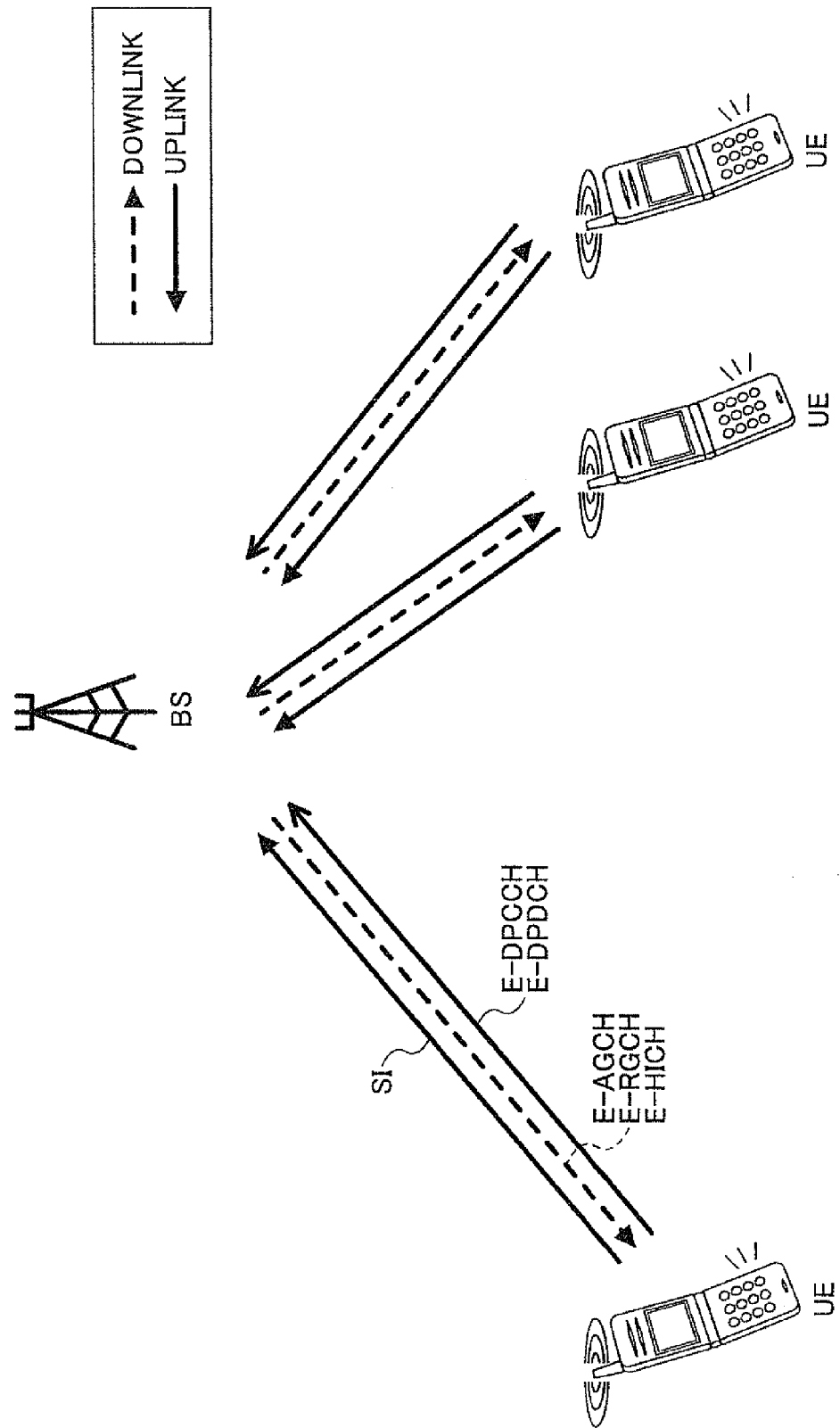
FIG. 1 illustrates HSUPA communication.
Figure 2:
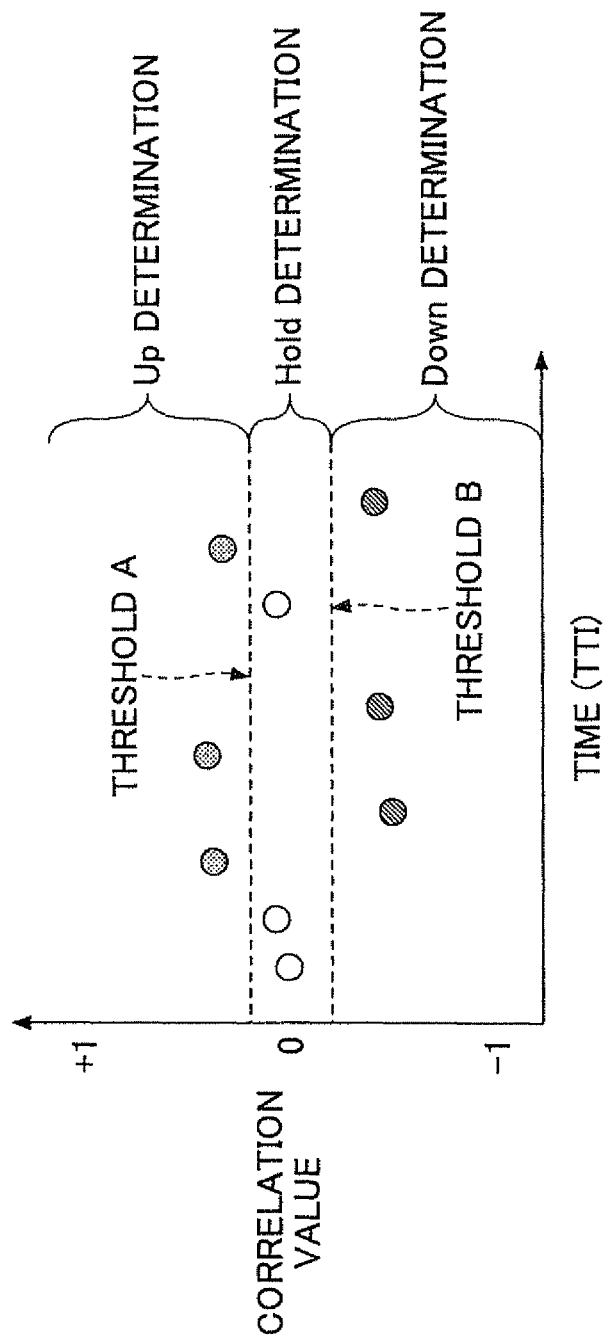
FIG. 2 depicts one example of correlation values and thresholds in a not good reception environment.
Figure 3:
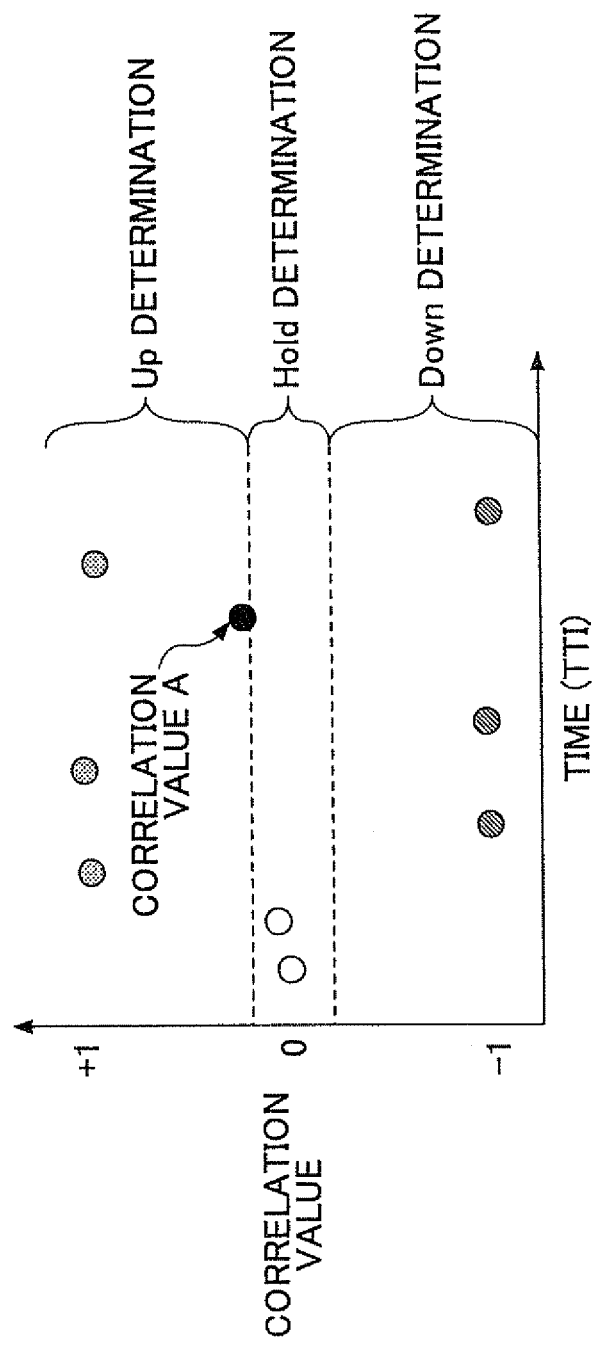
FIG. 3 depicts one example of correlation values and thresholds in a good reception environment.
Figure 4:
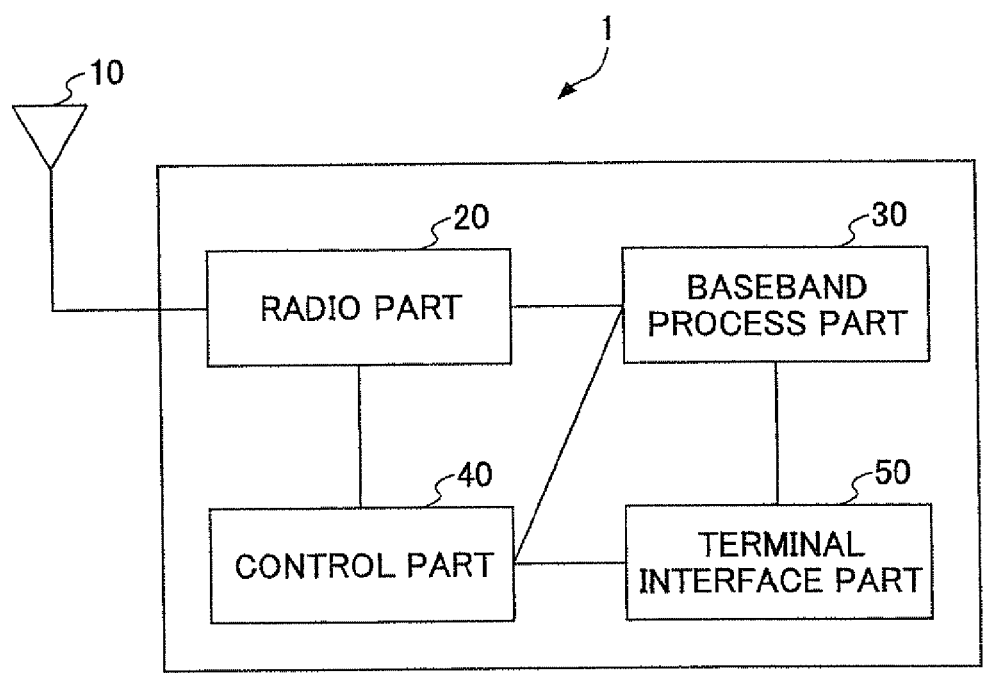
FIG. 4 depicts a block diagram of one example of hardware of a mobile terminal in the embodiments.

FIG. 4 depicts a block diagram of one example of hardware of a mobile terminal in the embodiments. As depicted in FIG. 4, the mobile terminal 1 includes an antenna 10, a radio part 20, a baseband process part 30, a control part 40 and a terminal interface part 50.

The antenna 10 transmits a radio signal amplified by a transmission amplifier (not depicted), and receives a radio signal from a base station. The radio part 20 carries out digital-to-analog conversion on a transmission signal spread by the baseband process part 30, converts the transmission signal into a radio-frequency signal by means of quadrature modulation, and amplifies the radio-frequency signal by means of a power amplifier. The radio part 20 amplifies the received radio signal, carries out analog-to-digital conversion on the radio signal, and transmits the digital signal to the baseband process part 30.

The baseband process part 30 carries out a baseband process such as adding an error correction code for transmission data, data modulation, spread modulation, despreading a received signal, determining a reception environment, threshold determination of respective channel signals, and decoding the error correction code.

The control part 40 carries out radio control such as transmitting and receiving a control signal. The terminal interface part 50 carries out an adaptor process for data, an interface process for a handset and an external terminal.

Figure 5:
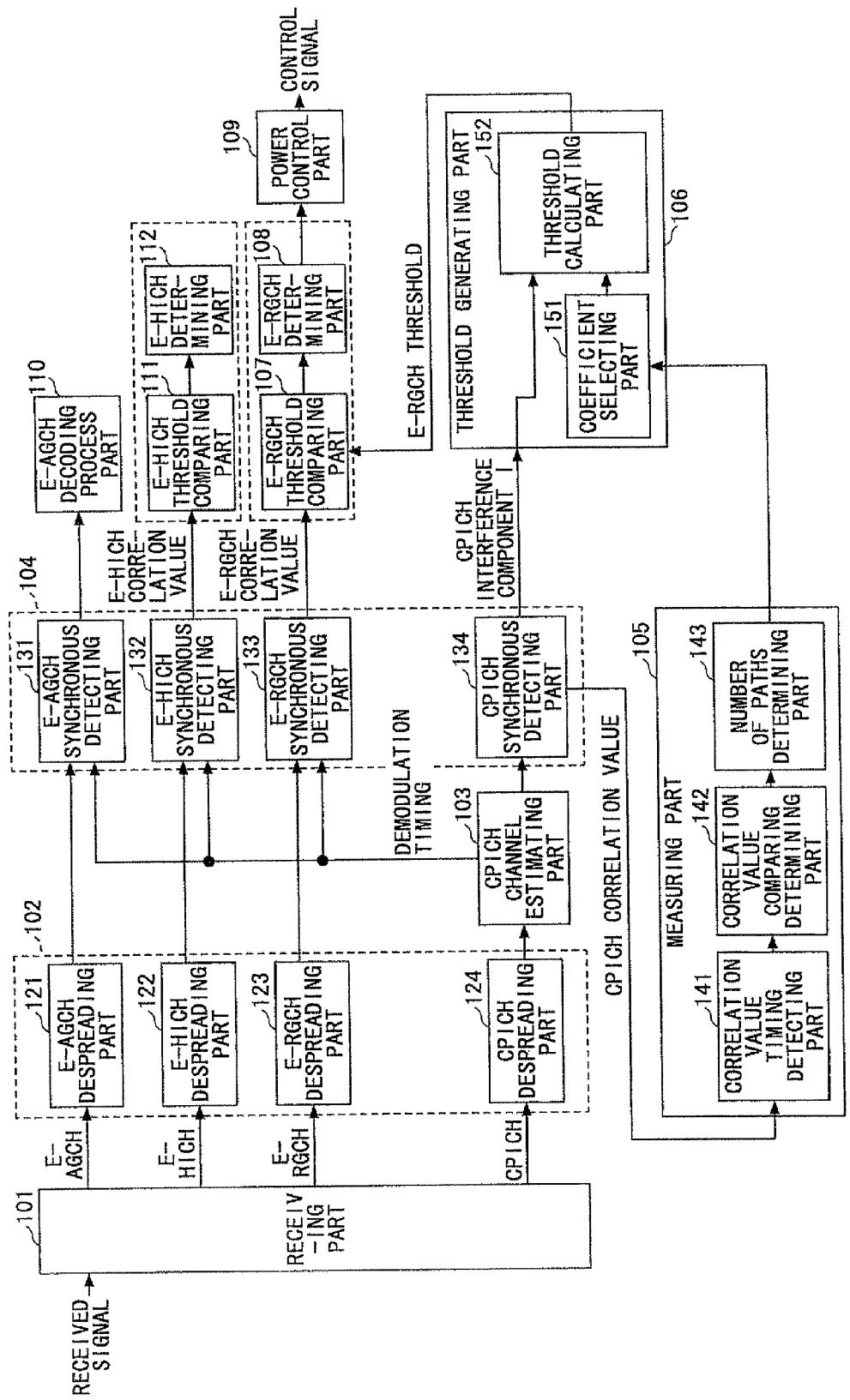
FIG. 5 depicts a block diagram of one example of functions of a mobile terminal in an embodiment 1.

FIG. 5 depicts a block diagram of one example of functions of the mobile terminal 1 in an embodiment 1. the mobile terminal 1 includes a receiving part 101, a despreading part 102, a CPICH channel estimating part 103, a synchronous detecting part 104, a measuring part 105, a threshold generating part 106, an E-RGCH channel estimating part 107, an E-RGCH channel determining part 108, a power control part 109, an E-AGCH decoding process part 110, an E-HICH threshold comparing part 111, and an E-HICH determining part 112. The functions depicted in FIG. 5 are carried out by the baseband process part 30 depicted in FIG. 4.

The receiving part 101 separates a received signal input from the radio part 20 into respective channels, i.e., E-AGCH, E-HICH, E-RGCH and CPICH (Common Pilot Channel). The despreading part 102 multiplies by a spreading code the same as that of a transmission side and carries out despreading on the respective channels that are output from the receiving part 101.

The despreading part 102 includes an E-AGCH despreading part 121, an E-HICH despreading part 122, an E-RGCH despreading part 123 and a CPICH despreading part 124. The respective despreading parts 121 through 124 multiply the respective channels by the spreading code and carry out despreading on the respective channels.

The CPICH channel estimating part 103 obtains a despread value of a channel that is output from the CPICH despreading part 124, and calculates a phase rotation amount that is used to carry out channel compensation based on the obtained despread value. The CPICH channel estimating part 103 outputs the calculated phase rotation amount to the synchronous detecting part 104. The channel estimating part 103 outputs timing at which the despread value has been obtained to the synchronous detecting part 104 as demodulation timing.

The synchronous detecting part 104 obtains respective despread values that are output by the despreading part 102, and carries out phase compensation by using the phase rotation amount, and carries out synchronous detection on the obtained respective despread values at the demodulation timing obtained from the CPICH channel estimating part 103. The synchronous detecting part 104 has an E-AGCH synchronous detecting part 131, an E-HICH synchronous detecting part 132, an E-RGCH synchronous detecting part 133 and a CPICH synchronous detecting part 134, to carry out synchronous detection on the despread values of the respective channel signals.

The E-AGCH synchronous detecting part 131 outputs a signal obtained from synchronous detection to the E-AGCH decoding process part 110. The E-HICH synchronous detecting part 132 calculates an E-HICH correlation value, and outputs the calculated E-HICH correlation value to the E-HICH threshold comparing part 111.

The E-RGCH synchronous detecting part 133 calculates an E-RGCH correlation value that is a correlation value between a signature pattern included in the despread signal and a signature pattern unique to E-RGCH, and outputs the calculated correlation value to the E-RGCH threshold comparing part 107. The E-RGCH signal is a control signal for controlling transmission power.

After carrying out synchronous detection on the CPICH, the CPICH synchronous detecting part 134 calculates a CPICH signal component S and a CPICH interference component I by the following formula (1):

$$S = \sum_{i=0}^{N-1} CpichSym(i)$$

$$I = \sum_{i=0}^{N-1} \left| N \times CpichSym(i) - \sum_{i=0}^{N-1} CpichSym(i) \right|^2$$

(1)

CpichSym(i): CPICH despread values from 0-th symbol to (N-1)-th symbol
S: CPICH signal component
I: CPICH interference component The CPICH synchronous detecting part 134 calculates a correlation value between a predetermined unique signal and the CPICH signal, and outputs the calculated correlation value to the measuring part 105.

The measuring part 105 measures a reception environment of the mobile terminal 1. In the embodiment 1, the measuring part 105 measures the reception environment based on the CPICH signal. In the case of thus using the CPICH signal, the reception environment may be measured by various methods, and details thereof will be described later. From the measuring part 105, information concerning the thus-obtained reception environment, for example, the number of paths, is output to the threshold generating part 106.

The threshold generating part 106 generates determination thresholds used to determine the E-RGCH signal as indicating Up, Down or Hold. The determination thresholds may also be simply referred to as thresholds, hereinafter. The threshold generating part 106 generates the thresholds, for example, based on the interference signal I of the CPICH signal and the information indicating the reception environment. Details of generating the thresholds will be described later together with details of determining the reception environment. The threshold generating part 106 outputs the generated thresholds to the E-RGCH threshold comparing part 107. The threshold generating part 106 generates the thresholds dynamically according to the reception environment of the mobile terminal and thus changes the determination thresholds.

The E-RGCH threshold comparing part 107 compares the E-RGCH correlation value obtained from the E-RGCH synchronous detecting part 133 with the thresholds obtained from the threshold generating part 106. The E-RGCH threshold comparing part 107 outputs a comparison result to the E-RGCH determining part 108.

The E-RGCH determining part 108 determines, based on the thus-obtained comparison result, whether the signal component of the E-RGCH signal is Up, Down or Hold. A specific determination method is as follows:

Up: $C_{E\text{-}RGCH} > Th$

Down: $C_{E\text{-}RGCH} < -Th$

Hold: $-Th \leq C_{E\text{-}RGCH} \leq Th$

The E-RGCH determining part 108 outputs the thus-obtained determination result of Up, Down or Hold to the power control part 109. The E-RGCH threshold comparing part 107 and the E-RGCH determining part 108 may be a single function.

The power control part 109 controls transmission power based on the determination result of the E-RGCH determining part 108. For example, the power control part 109 transmits a control signal to increase the transmission power to a transmission power amplifier of the radio part when the determination result is Up. The power control part 109 does not output a control signal to the transmission power amplifier to maintain the transmission power when the determination result is Hold. The power control part 109 transmits a control signal to decrease the transmission power to the transmission power amplifier when the determination result is Down.

The E-AGCH decoding process part 110 carries out a decoding process on the E-AGCH signal. The E-HICH threshold comparing part obtains the E-HICH correlation value from the E-HICH synchronous detecting part 132, and compares the E-HICH correlation value with a threshold to carry out an Ack/Nack determination. The comparison result is output to the E-HICH determining part 112.

The E-HICH determining part 112 obtains the comparison result from the E-HICH threshold comparing part 111 and carries out an ACK or NACK determination based on the comparison result.

Thus, it is possible to improve determination performance for the relative grant channel E-RGCH signal, and carry out communications with a stable throughput, by changing the threshold that is used to control the transmission power according to the reception environment of the mobile terminal 1. Below, a method of measuring the reception environment based on the CPICH signal will be described.

(Measurement 1)

A measurement 1 is a method of measuring the reception environment by determining whether there are multiple paths (multipath) or a single path (1 path) from the CPICH signal. The measuring part 105 depicted in FIG. 5 has a correlation value timing detecting part 141, a correlation value comparing determining part 142, and a number of paths determining part 143.

The correlation value timing detecting part 141 gradually changes the demodulation timing, obtains the correlation value at each demodulation timing from the CPICH synchronous detecting part 134, and further, detects several demodulation timings at which the correlation values are large. The correlation value comparing determining part 142 compares the correlation values at the demodulation timings detected by the correlation value timing detecting part 141 with a correlation threshold, and outputs the comparison result to the number of paths determining part 143.

Figures 6, 7:
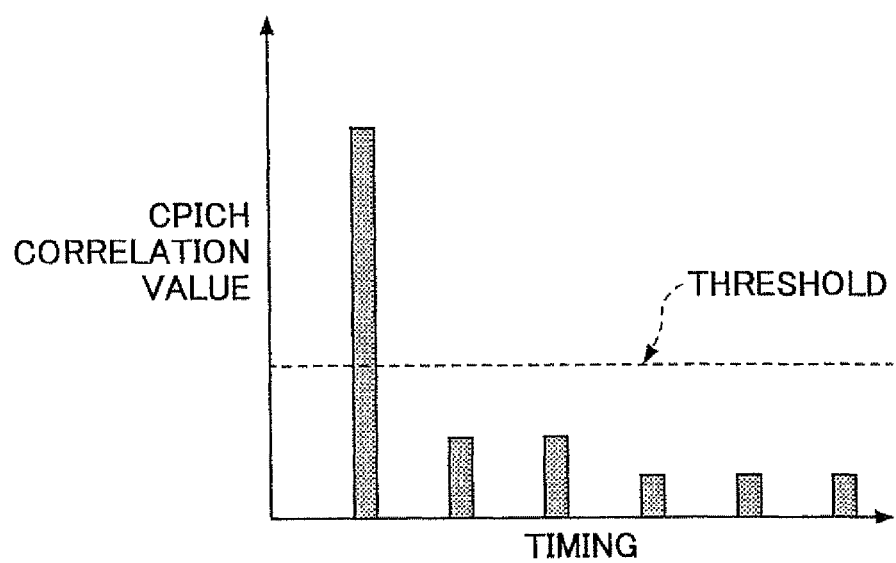
FIG. 6 depicts one example of determining the number of paths.
FIG. 7 depicts one example of a table in which the numbers of paths and thresholds are associated with each other.

The number of paths determining part 143 determines the number of paths based on the results of the comparisons between peak values of the CPICH correlation values and the correlation threshold. FIG. 6 depicts one example of determining the number of paths. In the example depicted in FIG. 6, the correlation values that exceed the correlation threshold are counted. When the thus-obtained count value is two or more, it is determined that there are multiple paths. Another method to determine the number of paths may be a method of determining that there is a single path when the maximum peak value is equal to or more than the total of the other peak values, and determining that there are multiple paths when the maximum peak value is smaller than the total of the other peak values. Further another method to determine the number of paths may be a method of determining that there are multiple paths when another peak value is larger than a value obtained from subtracting a predetermined value from the maximum peak value. The determination result of whether there is a single path or multiple paths is output to the threshold generating part 106.

It is noted that the number of paths determining part 143 may carry out not only a determination of whether there is a single path or multiple paths but also a determination of further classifying a state of multiple paths or classifying the number of multiple paths. For example, the number of paths determining part 143 may carry out a determination whether there is a single path, two to four paths, four to seven paths, or eight or more paths. The number of paths determining part 143 may output the number of paths to a coefficient selecting part 151 only when the number of paths is switched. For example, timing of outputting the number of paths may be timing at which a determination is switched from a single path to multiple paths, or from multiple paths to a single path.

The threshold generating part 106 has the coefficient selecting part 151 and a threshold calculating part 152. The coefficient selecting part 151 selects a coefficient based on a determination result of the number of paths obtained from the measuring part 105. The coefficient is used to generate the determination threshold for the E-RGCH signal. The coefficient selecting part 151 selects a coefficient $\alpha_1$ when the determination result is a single path, and selects a coefficient $\alpha m$ when the determination result is multiple paths. The selected coefficient is output to the threshold calculating part 152.

The threshold calculating part 152 obtains the threshold Th based on the CPICH interference component I obtained from the CPICH synchronous detecting part 134 and the coefficient obtained from the coefficient selecting part 151. For example, the threshold Th may be obtained from the following formulas (2) and (3):

In a case of a single path:

$$(\text{threshold Th}) = (\text{coefficient } \alpha_1) \times (\text{interference component } I) \quad (2)$$

In a case of multiple paths:

$$(\text{threshold Th}) = (\text{coefficient } \alpha_m) \times (\text{interference component } I) \quad (3)$$

There, $\alpha_1 > \alpha m$. Appropriate values may be given as the coefficients $\alpha_1$ and $\alpha m$ from an experiment. The threshold calculating part 152 outputs the calculated threshold Th to the E-RGCH threshold comparing part 107. Other than the above-mentioned methods, the threshold generating part 106 may obtain the threshold by using a table in which the numbers of paths and thresholds are associated with each other. FIG. 7 depicts one example of a table in which the numbers of paths and thresholds are associated with each other. The threshold generating part 106 may obtain the threshold Th by reading the table such as that depicted in FIG. 7 based on the number of paths obtained from the number of paths determining part 143. For example, T1 is determined as the threshold Th when there is a single path. It is noted that a relationship between T1 and T2 depicted in FIG. 7 is T1>T2.

According to the measurement 1, it is assumed that the reception environment is better in a case of a single path than a case of multiple paths, and the determination threshold is made larger in the case of a single path than the case of multiple paths. Thereby, the mobile terminal 1 can determine the reception environment according to the number of paths, and can change the determination threshold for the E-RGCH signal according to the reception environment. It is noted that, other than a single path or multiple paths, the number of paths may be further classified as mentioned above, and the threshold Th may be obtained from three or more threshold candidates may be obtained accordingly.

Figure 8:
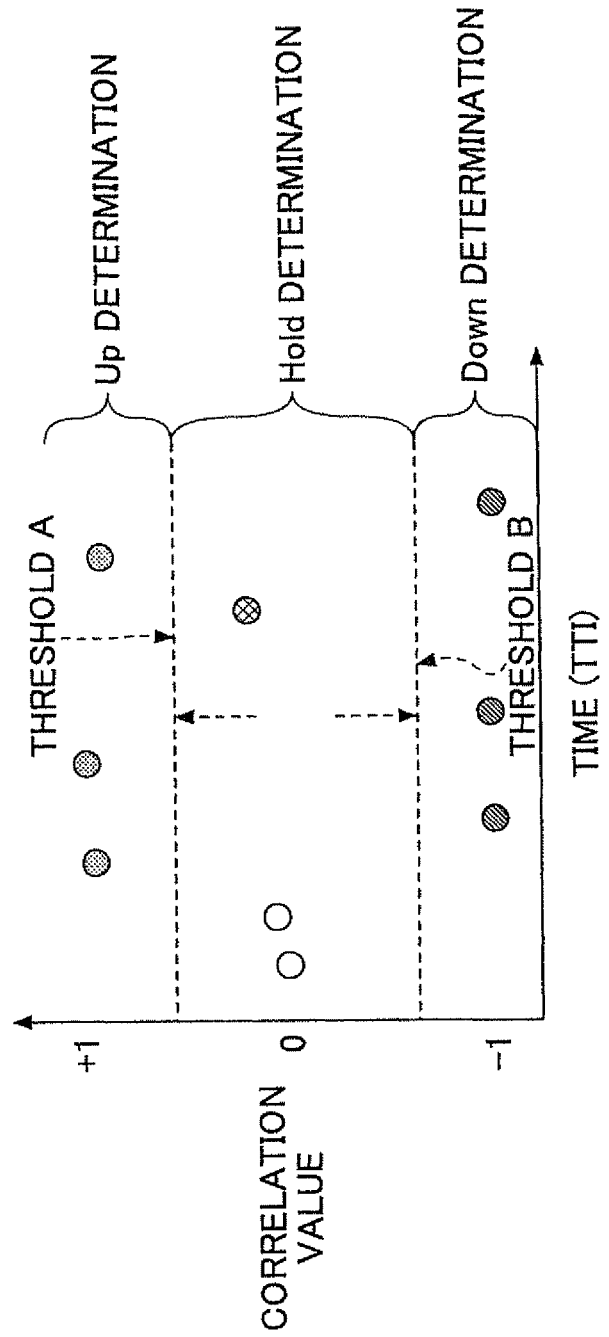
FIG. 8 depicts one example of determination thresholds in a case where a reception environment is good.

FIG. 8 depicts one example of determination thresholds in a case where the reception environment is good. As depicted in FIG. 8, in a case where the reception environment is good, the absolute values of the threshold A for Up and Hold and the threshold B for Down and Hold are larger than those in a case where the reception environment is not good.

Figure 9:
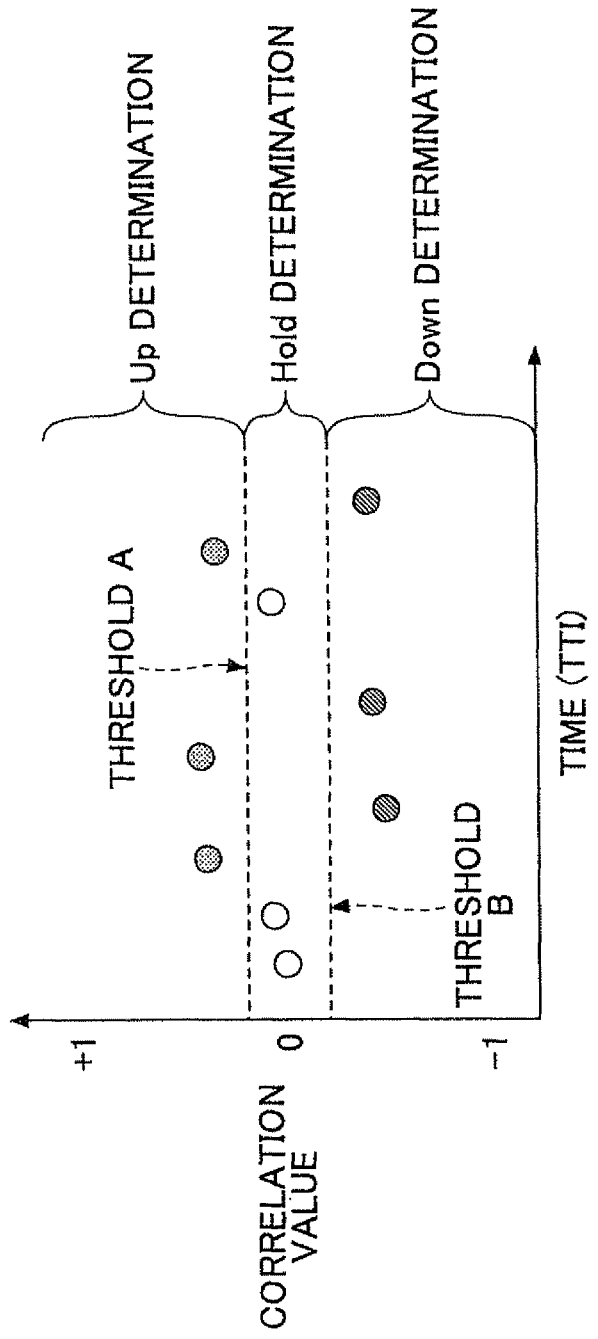
FIG. 9 depicts one example of determination thresholds in a case where a reception environment is not good.

FIG. 9 depicts one example of determination thresholds in a case where the reception environment is not good. As depicted in FIG. 9, in a case where the reception environment is not good, the absolute values of the threshold A for Up and Hold and the threshold B for Down and Hold are smaller than those in a case where the reception environment is good. The absolute values of the determination thresholds in a case where the reception environment is not good may be smaller than the absolute values of determination thresholds of the related art. Thus, it is possible to adapt to cope with signal degradation that occurs due to multipath interference, by measuring the reception environment based on the number of paths.

Figure 10:
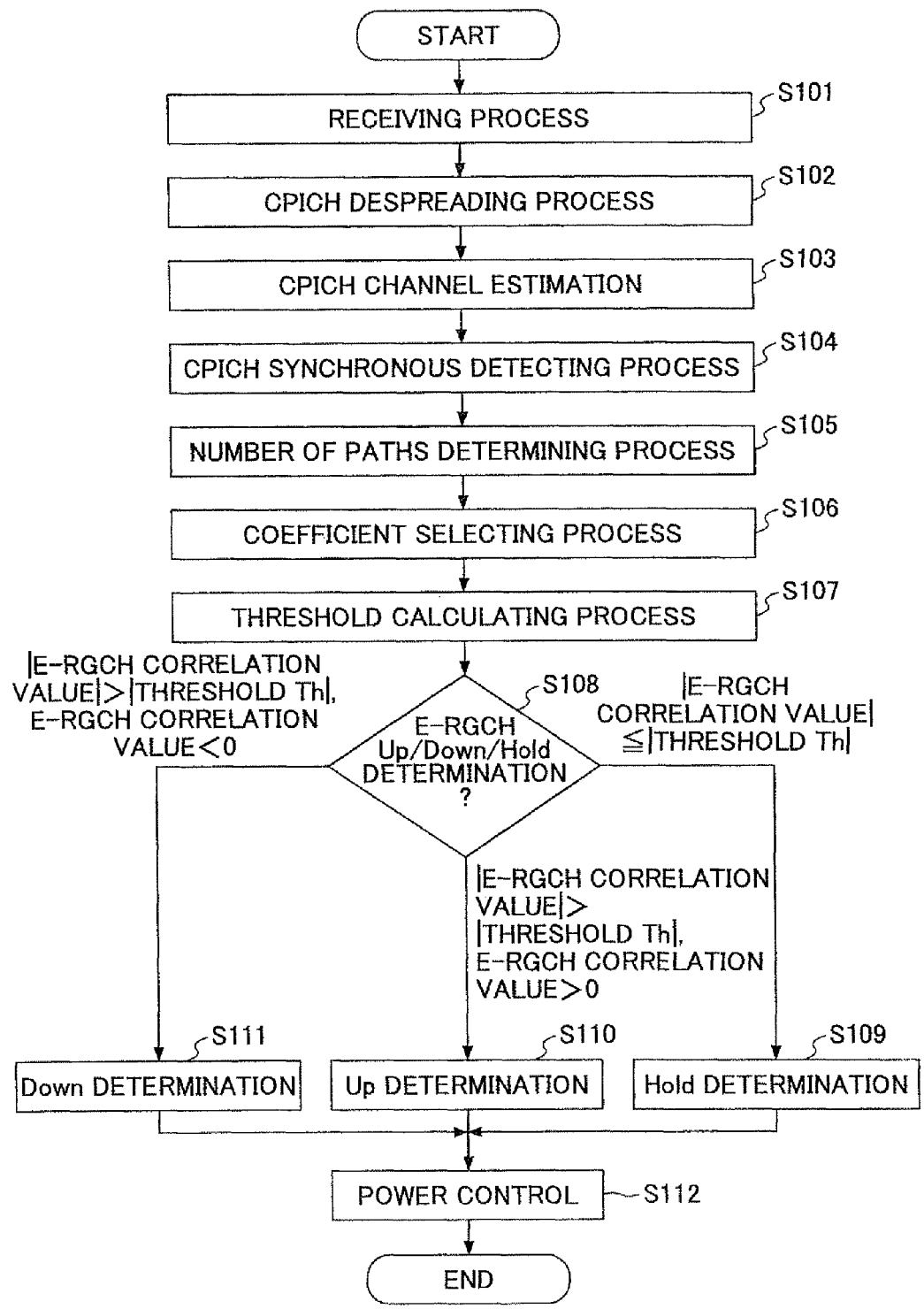
FIG. 10 depicts a flowchart of one example of a transmission power control process using a measurement 1.

Next, control of transmission power by using the measurement 1 will be described. FIG. 10 is a flowchart depicting one example of control of transmission power by using the measurement 1. In step S101 in FIG. 10, the receiving part 101 receives a signal from the antenna 10, and carries out a reception process of separating the signal into respective channel signals.

In step S102, the CPICH despreading part 124 carries out a despread process on the CPICH separated by the receiving part 101, and obtains a CPICH despread value. In step S103, the CPICH channel estimating part 103 obtains a channel estimated value from the CPICH despread value obtained from the CPICH despreading part 124.

In step S104, the CPICH synchronous detecting part 134 carries out synchronous detection by using the channel estimated value obtained from the CPICH channel estimating part 103. After the synchronous detection, the CPICH synchronous detecting part 134 calculates a CPICH interference component I, and also, calculates a correlation value of the CPICH signal.

In step S105, the number of paths determining part 143 determines the number of paths based on the CPICH correlation value. In step S106, the coefficient selecting part 151 selects the coefficient α based on the number of paths determined by the number of paths determining part 143. Selection of the coefficient may be carried out by reading the table holding coefficients associated with the numbers of paths or such. In step S107, the threshold calculating part 152 multiplies the CPICH interference component I and the coefficient α together, and obtains the threshold Th.

In step S108, the E-RGCH threshold comparing part 107 compares the threshold calculated by the threshold calculating part 152 and the E-RGCH correlation value, and carries out a determination. The determination in step S108 is carried, for example, as follows:

When the following requirement 1 is met, step S109 is proceeded to:

|E-RGCH correlation value|≤|threshold Th|   requirement 1

In step S109, the E-RGCH determining part 108 determines as Hold when the requirement 1 is met.

When the following requirement 2 is met, step S110 is proceeded to:

|E-RGCH correlation value|>|threshold Th|, and also,
    E-RGCH>0   requirement 2

In step S110, the E-RGCH determining part 108 determines as Up when the requirement 2 is met.

When the following requirement 3 is met, step S111 is proceeded to:

|E-RGCH correlation value|>|threshold Th|, and also,
    E-RGCH<0   requirement 3

In step S111, the E-RGCH determining part 108 determines as Down when the requirement 3 is met.

In step S112, based on the determination result of the E-RGCH correlation value, the power control part 109 controls power used when a signal is transmitted to the base station. The power control part 109 outputs a control signal for increasing a transmission output to the transmission power amplifier of the receiving part 101 when the determination result is UP, and outputs a control signal for decreasing a transmission output to the transmission power amplifier of the receiving part 101 when the determination result is Down, for example. The power control part 109 does not output a control signal for maintaining a current transmission power level when the determination result is Hold.

Figure 11:
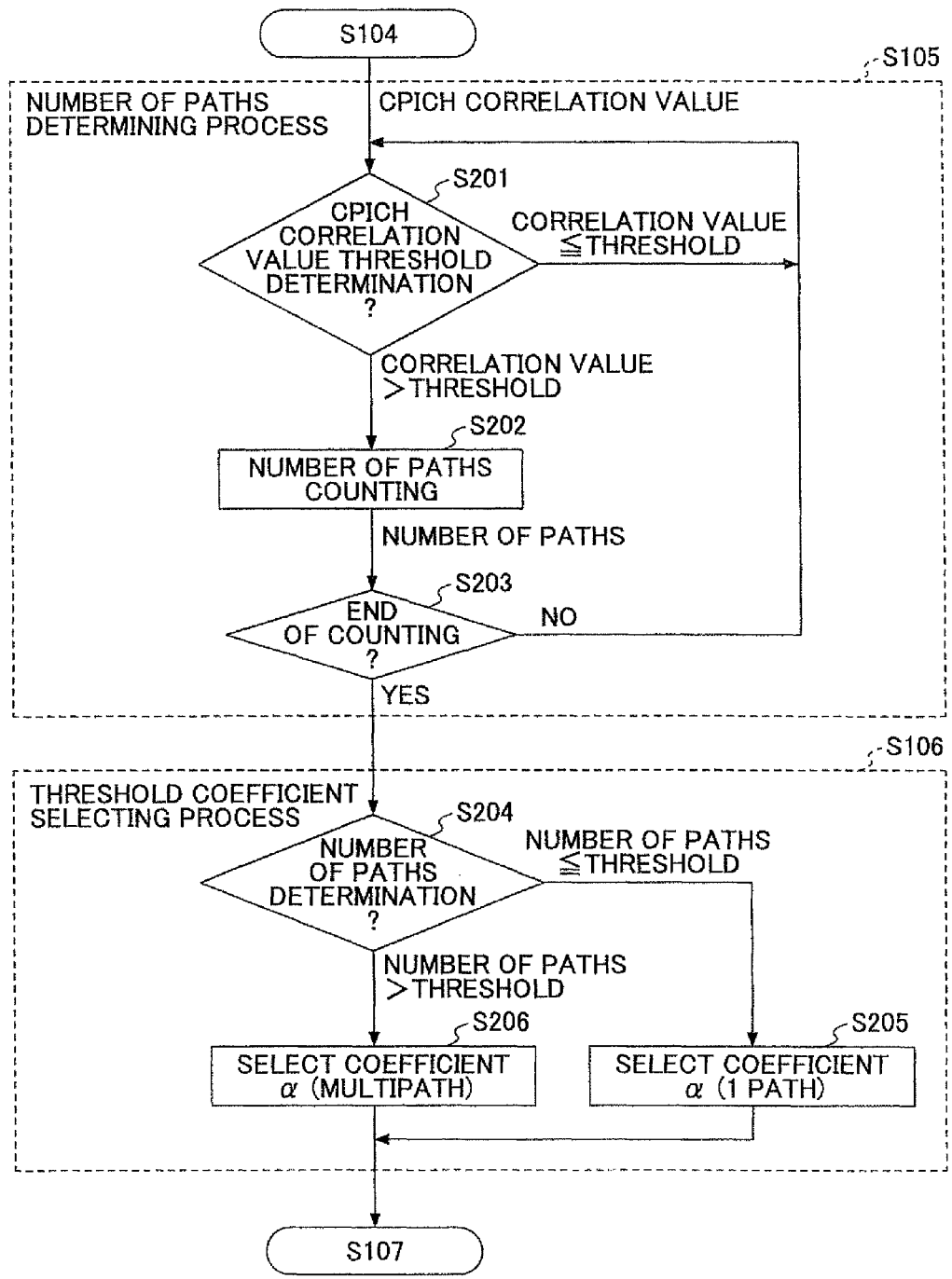
FIG. 11 depicts a flowchart of one example of a number of paths determining process and coefficient selecting process.

Next, details of a number of paths determining process in step S105 and a coefficient selecting process in step S106 will be described. FIG. 11 is a flowchart depicting one example of the number of paths determining process and the coefficient selecting process.

The number of paths determining process includes steps S201 through S203. In step S201, the number of paths determining part 143 carries out a threshold determination of the CPICH correlation value. The threshold determination of the correlation value is such that, when the correlation value is larger than the correlation threshold, step S202 is proceeded to. When the correlation value is equal to or smaller than the correlation threshold, step S201 is returned to.

In step S202, the number of paths determining part 143 accumulates the number of paths count value. In step S203, the number of paths determining part 143 determines whether the counting is finished. The number of paths determining part 143 proceeds to step S204 when calculation of the correlation values for all the modulation timings has been finished. The number of paths determining part 143 returns to step S201 when calculation of the correlation values for all the modulation timings has yet to be finished.

The coefficient selecting process includes steps S204 through S207. In step S204, the coefficient selecting part 151 determines whether the number of paths obtained from the number of paths determining part 143 is equal to or less than a path threshold. The path threshold is, for example, 1.

In step S204, when the number of paths is equal to or smaller than the path threshold, step S205 is proceeded to. When the number of paths is larger than the path threshold, step S206 is proceeded to. In step S205, the coefficient selecting part 151 selects the coefficient $\alpha_1$. In step S206, the coefficient selecting part 151 selects the coefficient αm. It is noted that $\alpha_1 > \alpha m$.

Thus, by measuring the reception environment based on the number of paths, it is possible to cope with signal degradation caused by multipath interference.

Figure 12:
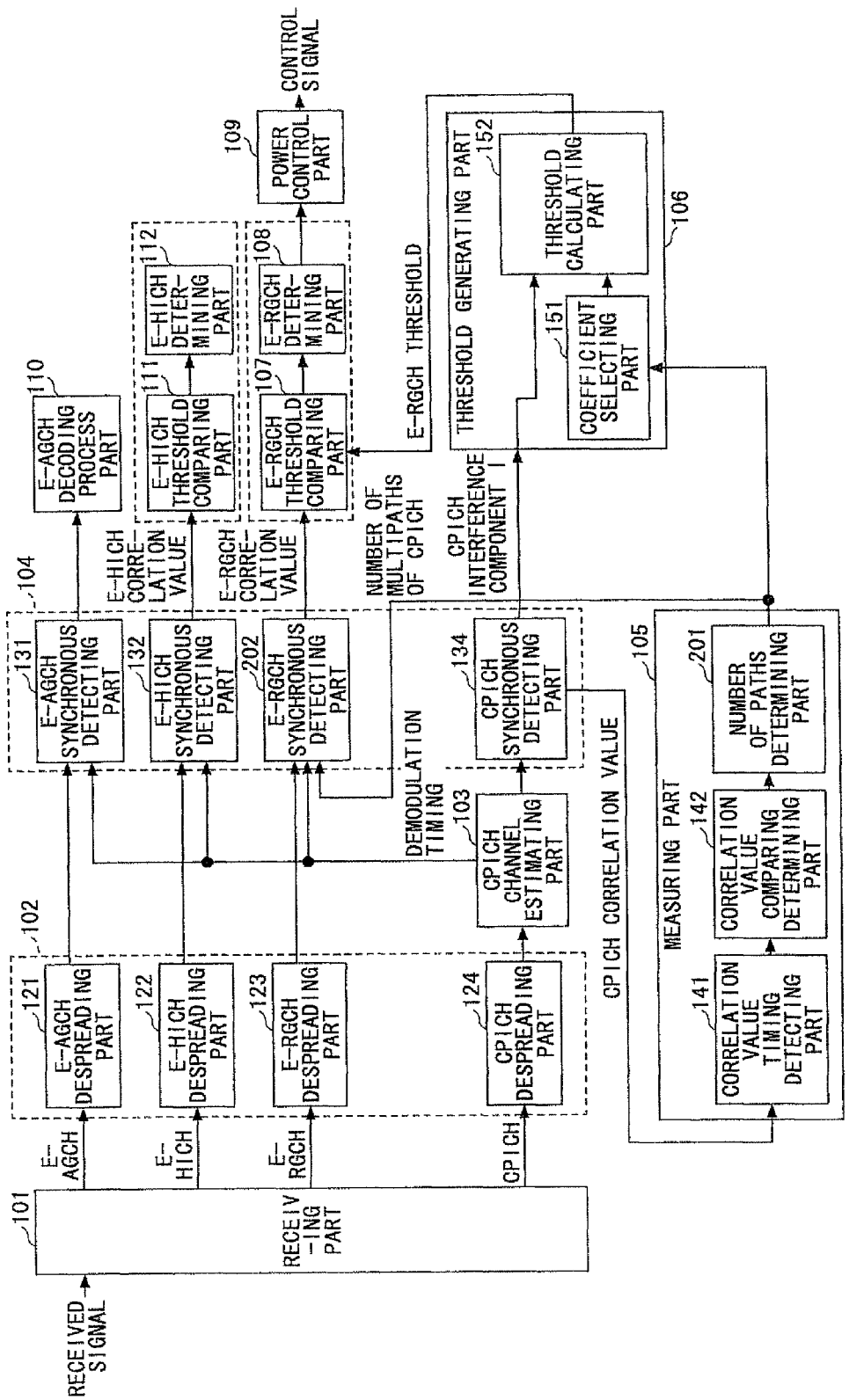
FIG. 12 depicts a block diagram of one example of functions of another mobile terminal using the measurement 1.

Next, a case where the mobile terminal applies the number of paths determination result to the E-RGCH synchronous detecting part 107 will be described. FIG. 12 is a block diagram depicting one example of another function of the mobile terminal using the measurement 1.

Below, the number of paths determining part 201 and the E-RGCH synchronous detecting part 202 will be described. The other functions are the same as those of FIG. 5. The number of paths determining part 201 outputs the number of paths determination result to the E-RGCH synchronous detecting part 202.

The E-RGCH synchronous detecting part 202 carries out synchronous detection of the E-RGCH signal for the number of paths obtained from the number of paths determining part 201. For example, when the number of paths is 1, the E-RGCH synchronous detecting part 202 carries out synchronous detection only once. As a result of the number of paths determined by the number of paths determining part 201 being output to the synchronous detecting part 202, the E-RGCH synchronous detecting part 202 carries out synchronous detection of the E-RGCH signal for the number of paths obtained from the number of paths determining part 201 and thus, the E-RGCH synchronous detecting part 202 can improve demodulation performance for the E-RGCH signal.

(Measurement 2)

Figure 13:
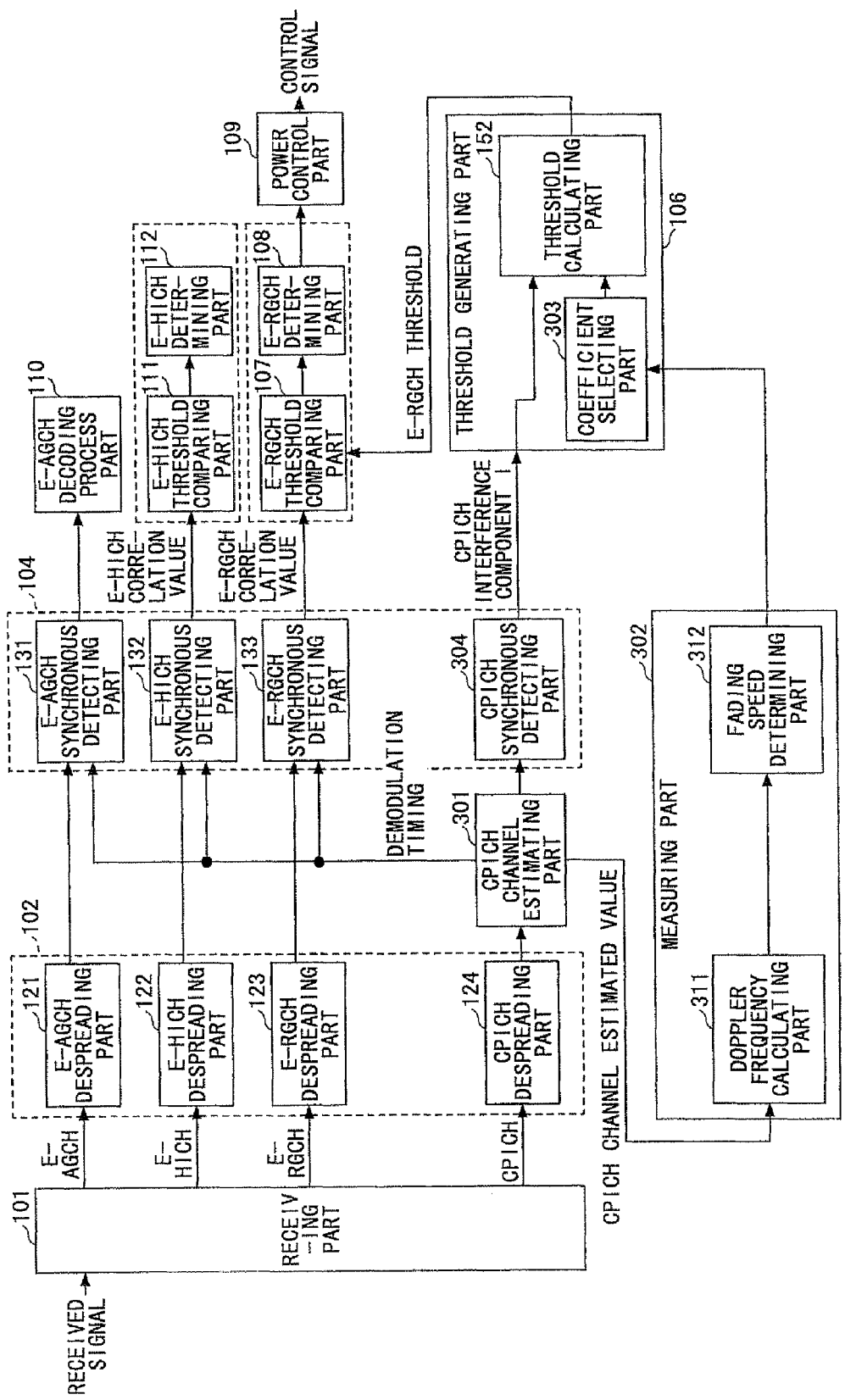
FIG. 13 depicts a block diagram of one example of functions of a mobile terminal using a measurement 2.

In measurement 2, a fading speed is determined from the CPICH signal, and the reception environment is measured. FIG. 13 is a block diagram depicting one example of a function of the mobile terminal using the measurement 2. A measuring part 302 depicted in FIG. 13 has a Doppler frequency calculating part 311 and a fading speed determining part 312. Below, a method of determining a fading speed by the measuring part 302, and generating a threshold will be described. Functions other than those of a CPICH channel estimating part 301, the measuring part 302, a coefficient selecting part 303 and a CPICH synchronous detecting part 304 are the same as those of FIG. 5.

The CPICH channel estimating part 301 outputs a CPICH channel estimated value to the CPICH synchronous detecting part 304 and the measuring part 302.

The measuring part 302 obtains a fading speed based on the CPICH estimated value. A method of obtaining a fading speed will be described later. The Doppler frequency calculating part 311 calculates a Doppler frequency that indicates a phase difference based on the CPICH estimated value. The fading speed determining part 312 determines a fading speed based on the Doppler frequency. The fading speed may be obtained by using generally known technology. The fading speed determining part 312 outputs the determined fading speed to the coefficient selecting part 303. The fading speed determining part 312 may output the fading speed to the coefficient selecting part 303 in a case where a speed threshold is between the currently determined fading speed and the previously determined fading speed. Thereby, the fading speed determining part 312 may avoid outputting the determined fading speed to the coefficient selecting part 303 each time when determining the fading speed.

The coefficient selecting part 303 selects a coefficient based on the fading speed obtained from the fading speed determining part 312. The coefficient is used to generate the determination threshold for the E-RGCH signal. The coefficient selecting part 303, for example, selects a coefficient $\alpha_A$ when the fading speed is less than 60 km/h (speed threshold), and selects a coefficient $\alpha_B$ when the fading speed is equal to or more than 60 km/h. A setting of the speed threshold 60 km/h for the fading speed may be appropriately changed.

A relationship between $\alpha_A$ and $\alpha_B$ is such that $\alpha_A > \alpha_B$. $\alpha_A$ and $\alpha_B$ will be generally referred to as $\alpha$. An appropriate value may be set as the coefficient $\alpha$ from an experiment or such. The coefficient selecting part 303 outputs the selected coefficient $\alpha$ to the threshold calculating part 152. The threshold calculating part 152 obtains the determination threshold Th by multiplying the coefficient $\alpha$ and the CPICH interference component I together, in the same way as that in the case of the measurement 1.

After synchronous detection, the CPICH synchronous detecting part 304 calculates a CPICH signal component S and a CPICH interference component I, and outputs the CPICH interference component I to the threshold generating part 106.

Figure 14:
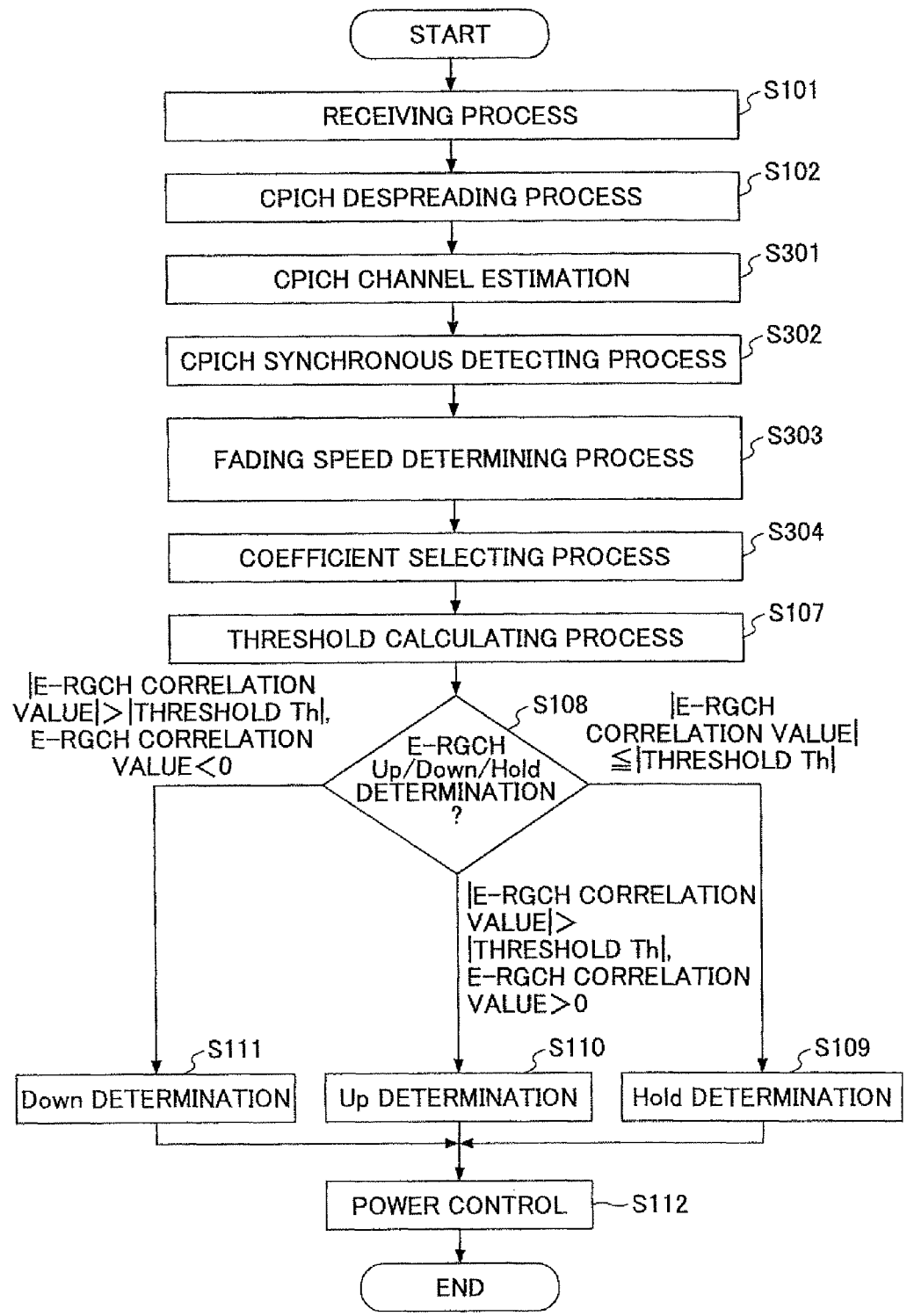
FIG. 14 depicts a flowchart of one example of a transmission power control process using the measurement 2.

FIG. 14 is a flowchart depicting one example of a transmission power control process using the measurement 2. In the process depicted in FIG. 14, the same reference numerals are given to steps the same as those of FIG. 10. In step S301, the CPICH channel estimating part 301 outputs the obtained channel estimated value to the CPICH synchronous detecting part 304 and the measuring part 302.

In step S302, after synchronous detection, the CPICH synchronous detecting part 304 calculates a CPICH signal component S and a CPICH interference component I, and outputs the CPICH interference component I to the threshold calculating part 152.

In step S303, the measuring part 302 calculates a Doppler frequency from the channel estimated value, and determines a fading speed. The determined fading speed is output to the coefficient selecting part 303.

In step S304, the coefficient selecting part 303 selects the coefficient $\alpha_A$ when the fading speed is less than 60 km/h, and selects the coefficient $\alpha_B$ when the fading speed is equal to or more than 60 km/h, for example. After the coefficient is thus determined, a subsequent process is the same as that depicted in FIG. 10.

Thus, by measuring the reception environment from the fading speed, it is possible to change the determination threshold for the E-RGCH signal to cope with signal degradation caused by a high speed movement of the mobile terminal.

(Measurement 3)

Figure 15:
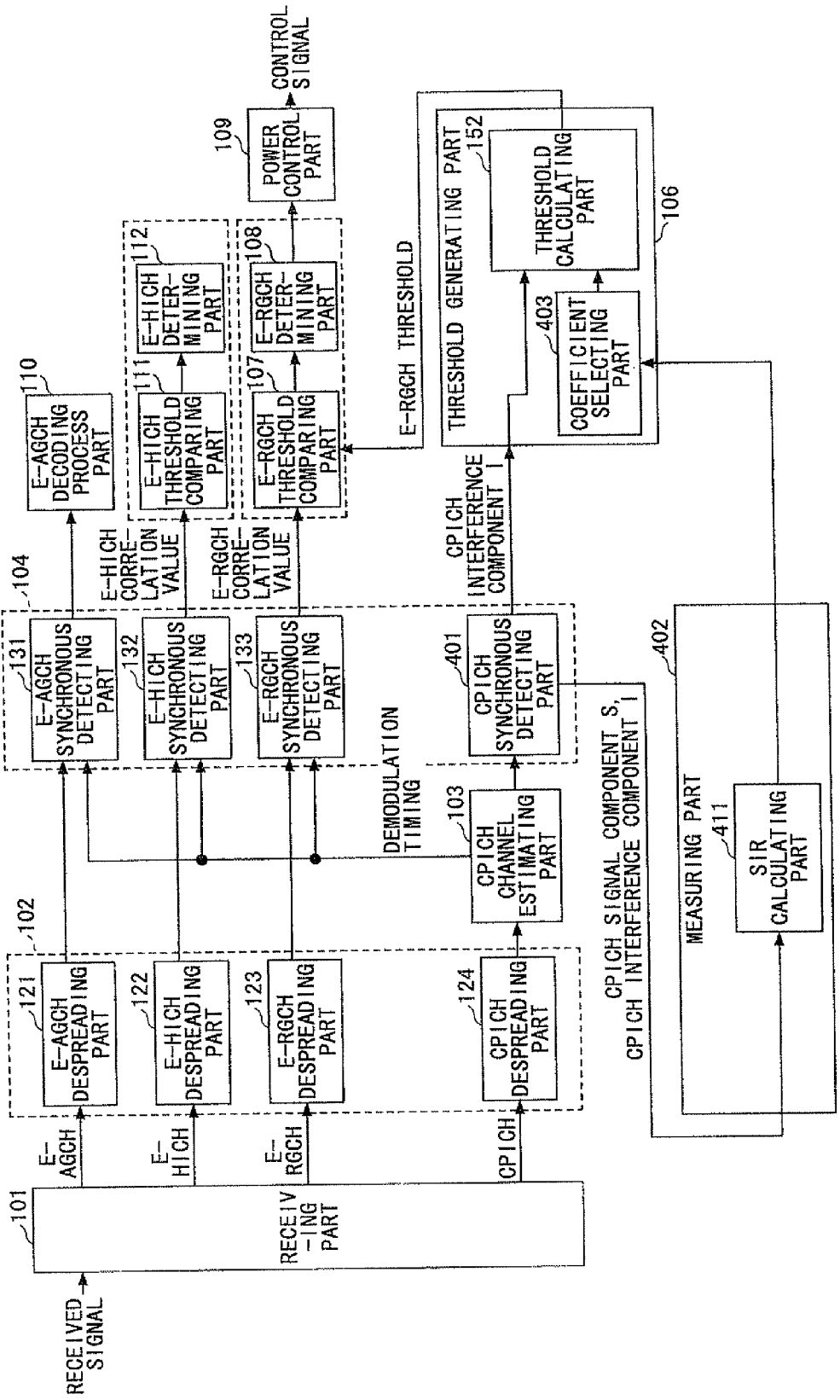
FIG. 15 depicts a block diagram of one example of functions of a mobile terminal using a measurement 3.

In measurement 3, SIR (Signal to Interference Ratio) of CPICH is calculated from the CPICH signal, and the reception environment is measured. FIG. 15 is a block diagram depicting one example of a function of the mobile terminal using the measuring 3. A measuring part 402 depicted in FIG. 15 has a SIR calculating part 411. Below, a method of calculating the SIR value by the measuring part 402 and generating a threshold will be described. Functions other than those of a CPICH synchronous detecting part 401, the measuring part 402 and a coefficient selecting part 403 are the same as those depicted in FIG. 5.

After synchronous detection, the CPICH synchronous detecting part 401 calculates a CPICH signal component S and a CPICH interference component I according to the above-mentioned formula (1). The CPICH synchronous detecting part 401 outputs the calculated CPICH signal component S and CPICH interference component I to the measuring part 402, and outputs the CPICH interference component I to the threshold calculating part 152.

The SIR calculating part 411 included in the measuring part 402 calculates the SIR value based on the obtained CPICH signal component S and CPICH interference component I. The SIR value is obtained from dividing the signal component S by the interference component I. The SIR calculating 411 outputs the calculated SIR value to the coefficient selecting part 403. The SIR calculating part 411 may output the currently calculated SIR value to the coefficient selecting part 403 in a case where a SIR threshold is between the currently calculated SIR value and the previously calculated SIR value. Thereby, the SIR calculating part 411 may avoid outputting the calculated SIR value to the coefficient selecting part 403 each time when calculating the SIR value.

The coefficient selecting part 403 selects a coefficient based on the SIR value obtained from the SIR calculating part 411. The coefficient is used to generate the determination threshold for the E-RGCH signal. The coefficient selecting part 403 selects a coefficient $\alpha_A$ when the SIR value is less than 10 dB (SIR threshold), and selects a coefficient $\alpha_B$ when the SIR value is equal to or more than 10 dB, for example. A relationship between $\alpha_A$ and $\alpha_B$ is such that $\alpha_A > \alpha_B$. The coefficient selecting part 403 outputs the selected coefficient $\alpha$ to the threshold calculating part 152. The threshold calculating part 152 obtains the determination threshold Th by multiplying the coefficient $\alpha$ and the CPICH interference component I together, in the same way as that in the case of the measurement 1.

Figure 16:
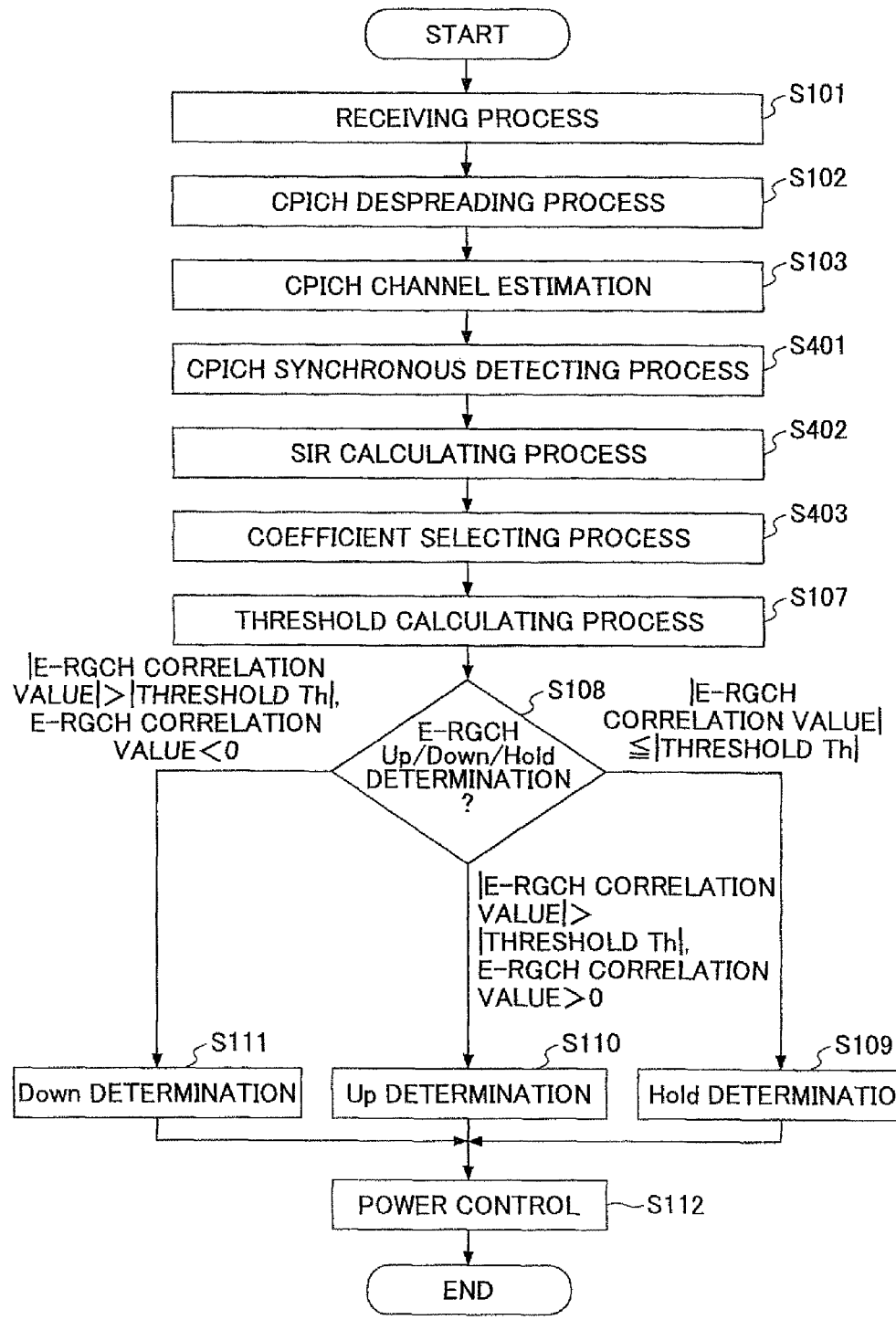
FIG. 16 depicts a flowchart of one example of a transmission power control process using the measurement 3.

FIG. 16 is a flowchart depicting one example of a transmission power control process using the measurement 3. In the process depicted in FIG. 16, the same reference numerals are given to steps the same as those of FIG. 10. In step S401, the CPICH synchronous detecting part 401 outputs calculated CPICH signal component S and CPICH interference component I to the measuring part 402, and outputs the CPICH interference component I to the threshold generating part 106.

In step S402, the SIR calculating part 411 calculates a SIR value using the CPICH signal component S and the CPICH interference component I. The SIR calculating part 411 outputs the calculated SIR value to the coefficient selecting part 403.

In step S403, the coefficient selecting part 403 selects the coefficient used to calculate the threshold based on the obtained SIR value. The coefficient selecting part 403 selects the coefficient $\alpha_B$ when the SIR value is equal to or more than 10 dB, and selects the coefficient $\alpha_A$ when the SIR value is less than 10 dB, for example. After the coefficient is thus determined, a process carried out after that is the same as the process depicted in FIG. 10.

Thus, by measuring the reception environment based on the SIR value, it is possible to change the determination threshold for the E-RGCH signal to cope with signal degradation caused by interference power.
(Measurement 4)

Figure 17:
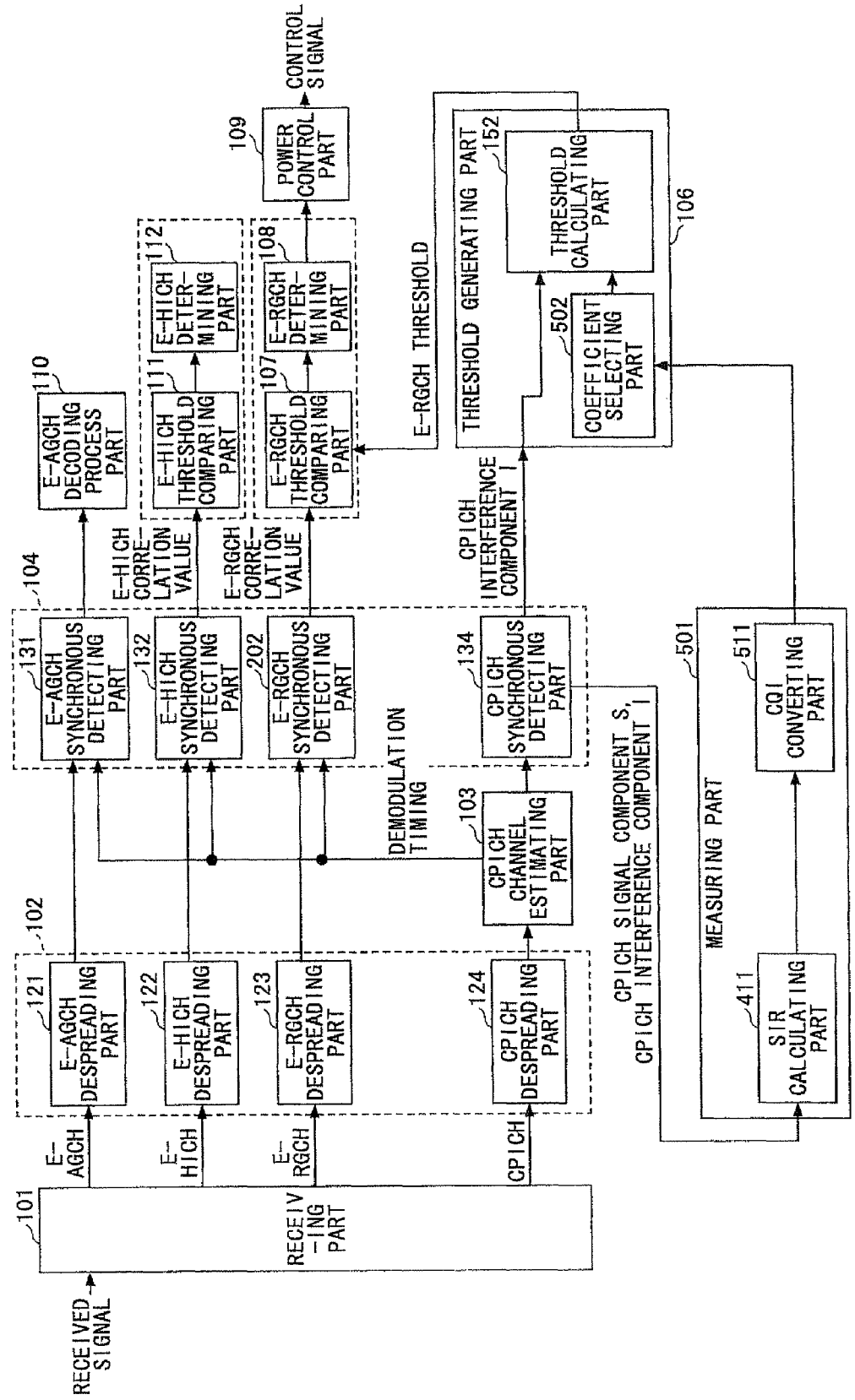
FIG. 17 depicts a block diagram of one example of functions of a mobile terminal using a measurement 4.

In measurement 4, SIR of CPICH is calculated from the CPICH signal, is then converted into CQI (Channel Quality Indicator), and the reception environment is measured. FIG. 17 is a block diagram depicting one example of a function of the mobile terminal using the measurement 4. A measuring part 501 depicted in FIG. 17 has a SIR calculating part 411 and a CQI converting part 511. Below, a method of calculating a CQI value by the measuring part 501, and generating a threshold will be described. Functions other than those of the measuring part 501 and a coefficient selecting part 502 are the same as those depicted in FIGS. 5 and 15.

The measuring part 501 converts a calculated SIR value to a CQI value. Specifically, the CQI converting part 511 converts the obtained SIR value obtained from the SIR calculating part 411 based on the SIR value. The CQI converting part 511, for example, may hold a converting table for converting a SIR value to a CQI value, and converts a SIR value to a CQI value by reading the converting table. The CQI converting part 511 outputs the converted CQI value to the coefficient selecting part 502. The CQI converting part 511 may output the currently converted CQI value to the coefficient selecting part 502 in a case where a CQI threshold is between the currently converted CQI value and the previously converted CQI value. Thereby, the CQI converting part 511 may avoid outputting the converted CQI value to the coefficient selecting part 502 each time when converting to a CQI value.

The coefficient selecting part 502 selects a coefficient based on the CQI value obtained from the CQI converting part 511. The coefficient is used to generate the determination threshold for the E-RGCH signal. The coefficient selecting part 502 selects a coefficient $\alpha_A$ when the CQI value is less than 10 (CQI threshold), and selects a coefficient $\alpha_B$ when the CQI value is equal to or more than 10, for example. A relationship between $\alpha_A$ and $\alpha_B$ is such that $\alpha_A > \alpha_B$. The coefficient selecting part 502 outputs the selected coefficient $\alpha$ to the threshold calculating part 152. The threshold calculating part 152 obtains the determination threshold Th by multiplying the coefficient $\alpha$ and the CPICH interference component I together, in the same way as that in the case of the measurement 1.

Figure 18:
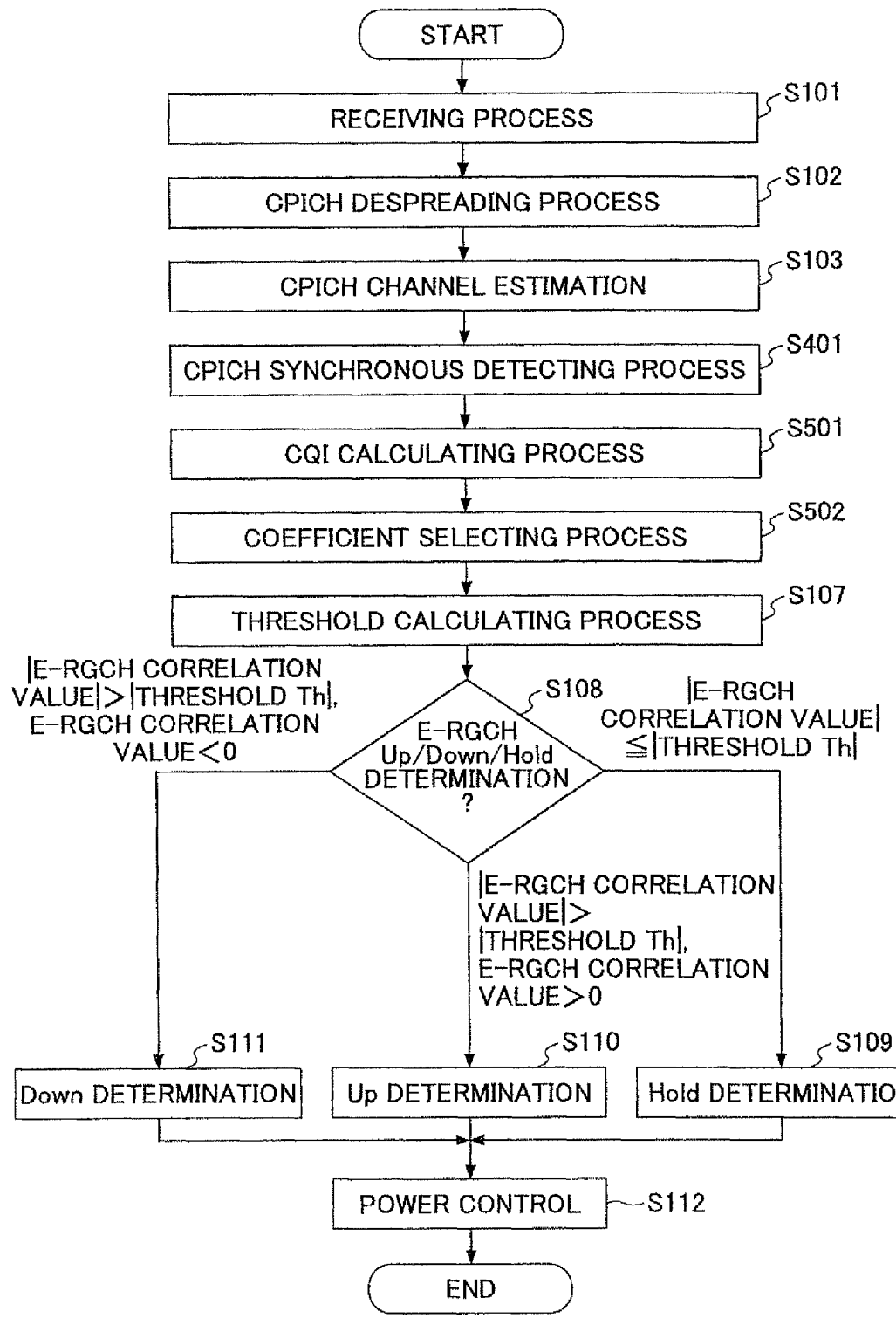
FIG. 18 depicts a flowchart of one example of a transmission power control process using the measurement 4.

FIG. 18 is a flowchart depicting one example of a transmission power control process using the measurement 4. In the process depicted in FIG. 18, the same reference numerals are given to steps the same as those of FIGS. 10 and 16. In step S501, the measuring part 501 obtains a CQI value. Specifically, the CQI converting part 511 obtains a SIR value from the SIR calculating part 411, and converts the SIR value to a CQI value. The CQI converting part 511 outputs the CQI value to the coefficient selecting part 502.

In step S502, the coefficient selecting part 502 selects the coefficient used to calculate the threshold based on the obtained CQI value. The coefficient selecting part 502 selects the coefficient $\alpha_B$ when the CQI value is equal to or more than 10, and selects the coefficient $\alpha_A$ when the CQI value is less than 10, for example. After the coefficient is thus determined, a process carried out after that is the same as the process depicted in FIG. 10.

Thus, by measuring the reception environment based on the CQI value, it is possible to change the determination threshold for the E-RGCH signal according to a value indexing the reception quality of the terminal.
(Measurement 5)

Figure 19:
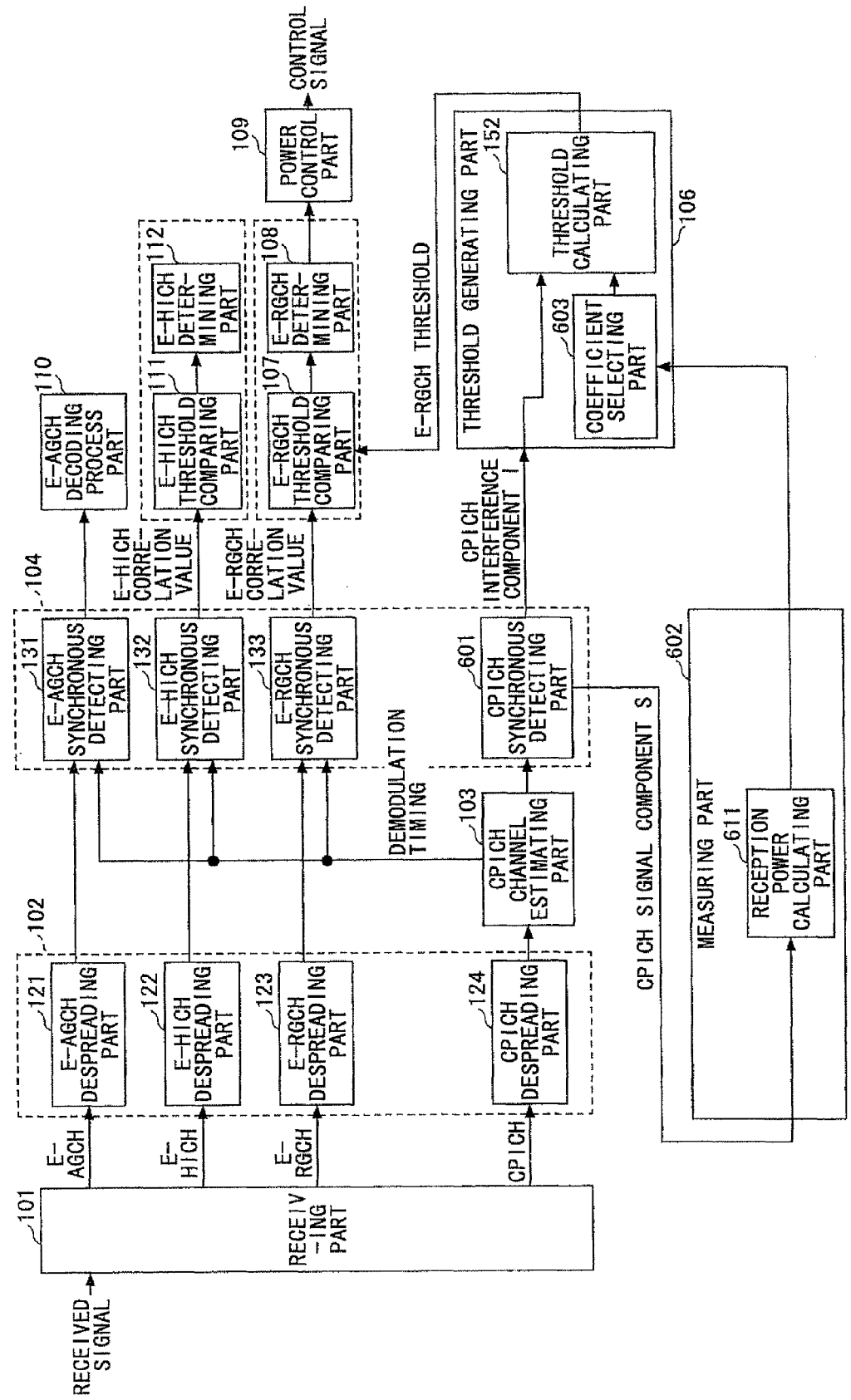
FIG. 19 depicts a block diagram of one example of functions of a mobile terminal using a measurement 5.

In measurement 5, reception power of CPICH is calculated from the CPICH signal, and the reception environment is measured. FIG. 19 is a block diagram depicting one example of a function of the mobile terminal using the measurement 5. A measuring part 602 depicted in FIG. 19 has a reception power calculating part 611. Below, a method of calculating reception power by the measuring part 602, and generating a threshold will be described. Functions other than those of a CPICH synchronous detecting part 601, the measuring part 602 and a coefficient selecting part 603 are the same as those depicted in FIG. 5.

The CPICH synchronous detecting part 601 calculates a CPICH signal component S and a CPICH interference component I according to the above-mentioned formula (1), after synchronous detection. The CPICH synchronous detecting part 601 outputs the calculated CPICH signal component S to the measuring part 602 and outputs the CPICH interference component I to the threshold generating part 106.

The reception power calculating part 611 included in the measuring part 602 calculates reception power RSCP (Received Signal Code Power) of CPICH with a predetermined period based on the CPICH signal component S. The reception power calculating part 611 outputs the calculated reception power to the coefficient selecting part 603. The reception power calculating part 611 may output a currently calculated reception power in a case where a power threshold is between the currently calculated reception power and the previously calculated reception power. Thereby, the reception power calculating part 611 may avoid outputting the calculated reception power to the coefficient selecting part 603 each time when calculating the reception power.

The coefficient selecting part 603 selects a coefficient based on the reception power obtained from the reception power calculating part 611. The coefficient is used to generate the determination threshold for the E-RGCH signal. The coefficient selecting part 603 selects a coefficient $\alpha_A$ when the reception power is less than 50 dBm (power threshold), and selects a coefficient $\alpha_B$ when the reception power is equal to or more than 50 dBm, for example. A relationship between $\alpha_A$ and $\alpha_B$ is such that $\alpha_A > \alpha_B$. The coefficient selecting part 603 outputs the selected coefficient $\alpha$ to the threshold calculating part 152. The threshold calculating part 152 obtains the determination threshold Th by multiplying the coefficient $\alpha$ and the CPICH interference component I together, in the same way as that in the case of the measurement 1.

Figure 20:
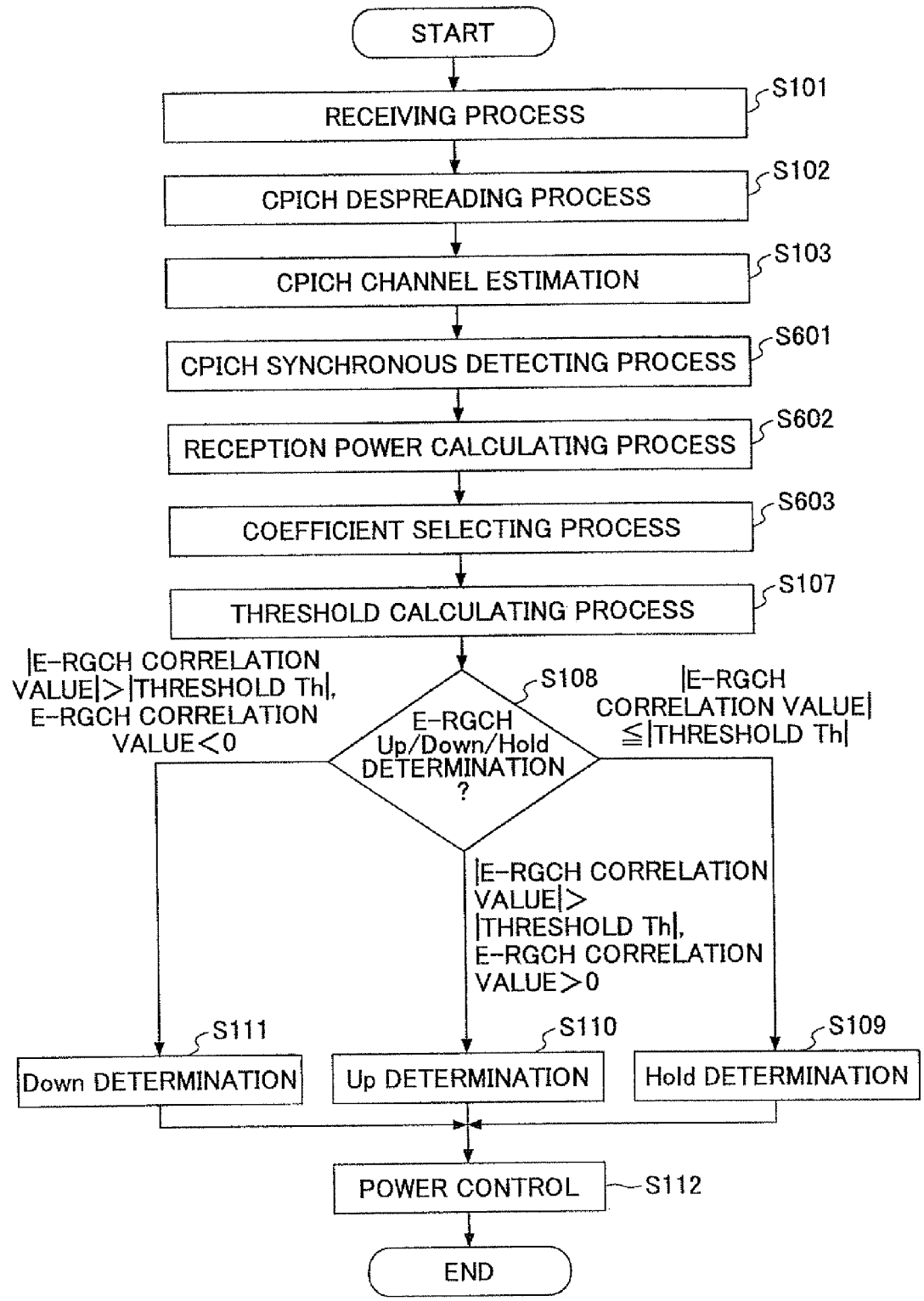
FIG. 20 depicts a flowchart of one example of a transmission power control process using the measurement 5.

FIG. 20 is a flowchart depicting one example of a transmission power control process using the measurement 5. In the process depicted in FIG. 20, the same reference numerals are given to steps the same as those of FIG. 10. In step S601, the CPICH synchronous detecting part 601 outputs the calculated CPICH signal component S to the measuring part 602 and outputs the calculated interference component I to the threshold generating part 106.

In step S602, the reception power calculating part 611 calculates reception power by using the CPICH signal component S. The reception power calculating part 611 outputs the calculated reception power to the coefficient selecting part 603.

In step S603, the coefficient selecting part 603 selects the coefficient used to calculate the threshold based on the obtained reception power. The coefficient selecting part 603 selects the coefficient $\alpha_B$ when the reception power is equal to or more than 50 dBm, and selects the coefficient $\alpha_A$ when the reception power is less than 50 dBm, for example. After the coefficient is thus determined, a process carried out after that is the same as the process depicted in FIG. 10.

Thus, by measuring the reception environment based on the reception power, it is possible to change the determination threshold for the E-RGCH signal according to whether the terminal is in a weak electric field environment.

Thus, according to the embodiment 1, it is possible to improve performance of determining the relative grant channel E-RGCH signal component by changing the determination threshold for the E-RGCH signal according to the reception environment measured based on the CPICH signal.

[Embodiment 2]

Next, a mobile terminal in an embodiment 2 of the present invention will be described. In the embodiment 2, the reception environment is measured based on a DPCH (Dedicated Physical Channel) signal. Below, measurement 6 and measurement 7 in which the reception environment is measured based on the DPCH signal will be described.

(Measurement 6)

Figure 21:
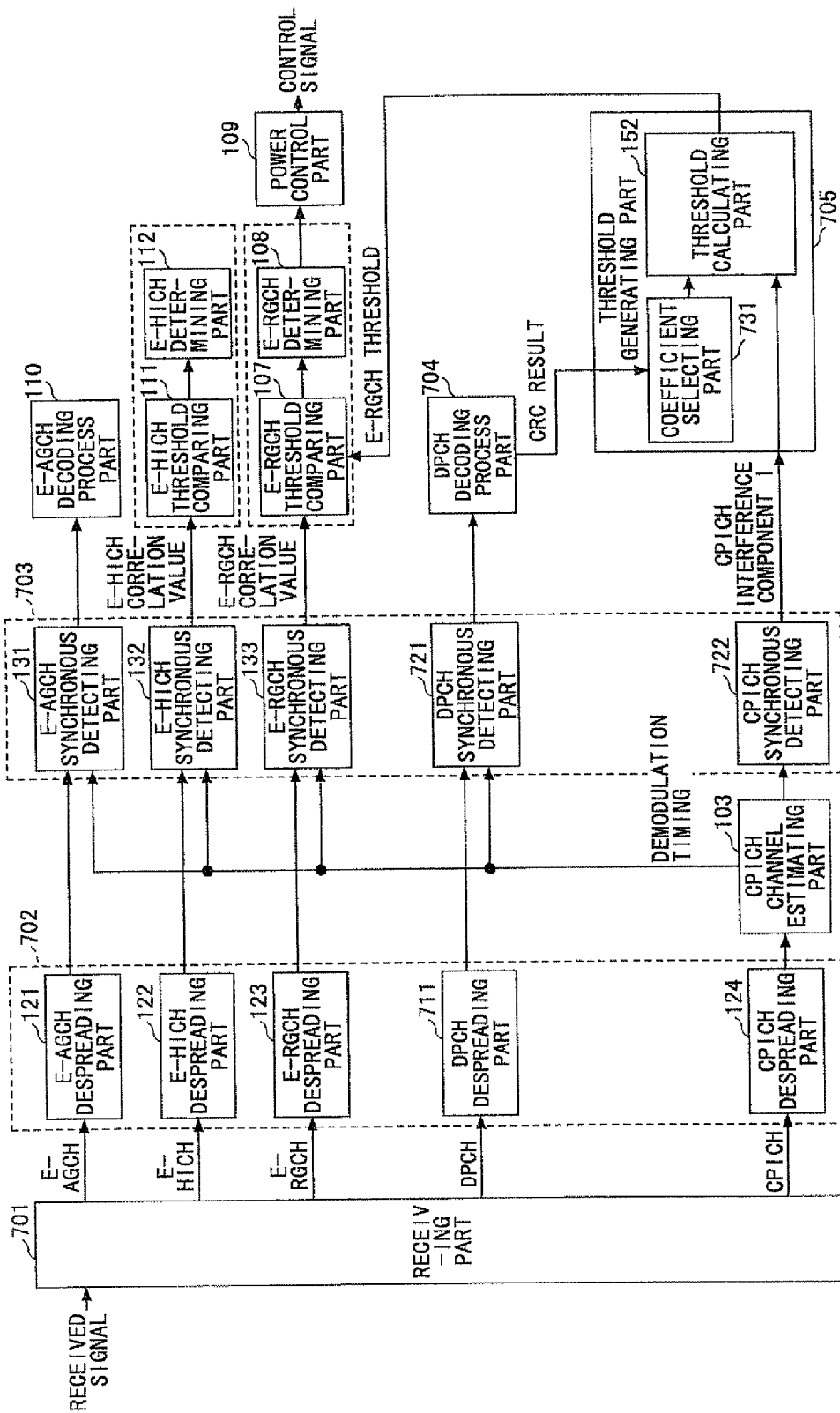
FIG. 21 depicts a block diagram of one example of functions of a mobile terminal using a measurement 6.

FIG. 21 is a block diagram depicting one example of functions of a mobile terminal using the measurement 6. The mobile terminal depicted in FIG. 21 includes a receiving part 701, a despreading part 702, a synchronous detecting part 703, a DPCH decoding process part 704 and a threshold generating part 705. The other functions are the same as those depicted in FIG. 5, and the same reference numerals are given thereto. The receiving part 701 receives a signal, and separates the received signal into respective channel signals, i.e., E-AGCH, E-HICH, E-RGCH, DPCH and CPICH.

A DPCH despreading part 711 carries out a despreading process on the DPCH signal obtained from the receiving part 701, and obtains a DPCH despread value. The DPCH despreading part 711 outputs the obtained DPCH despread value to a DPCH synchronous detecting part 721.

The DPCH synchronous detecting part 721 obtains the despread value from the DPCH synchronous detecting part 711, carries out phase compensation by using the phase rotation amount obtained from the CPICH channel estimating part 103, and carries out synchronous detection. A signal obtained from the synchronous detection is output to the DPCH decoding process part 704.

A CPICH synchronous detecting part 722 calculates a CPICH interference component I from the CPICH channel estimated value. A method of calculating a CPICH interference component I is, for example, according to the above-mentioned formula (1). The CPICH synchronous detecting part 722 outputs the CPICH interference component I to the threshold generating part 152.

The DPCH decoding process part 704 carries out a decoding process on the DPCH signal obtained from the synchronous detection. The decoding process includes processes up to and including an error correction process and a CRC (Cyclic Redundancy Check) determination. The DPCH decoding process part 704 outputs a CRC determination result to the coefficient selecting part 731 of the threshold generating part 705. In the measurement 6, the DPCH decoding process part 704 acts as a measuring part that measures the reception environment. The DPCH decoding part 704 may output the currently determined CRC result to the coefficient selecting part 731 in a case where a CRC threshold is between the currently determined CRC result and the previously determined CRC result.

The coefficient selecting part 731 selects a coefficient based on the CRC determination result obtained from the DPCH decoding process part 704. The coefficient is used to generate the determination threshold for the E-RGCH signal. The coefficient selecting part 731 selects a coefficient $\alpha_A$ when the BLER (Block Error Rate) is less than 0.05 (CRC threshold), and selects a coefficient $\alpha_B$ when the BLER is equal to or more than 0.05, for example. A relationship between $\alpha_A$ and $\alpha_B$ is such that $\alpha_A > \alpha_B$. The coefficient selecting part 731 outputs the selected coefficient $\alpha$ to the threshold calculating part 152. The threshold calculating part 152 obtains the determination threshold Th by multiplying the coefficient $\alpha$ and the CPICH interference component I together, in the same way as that in the case of the measurement 1.

Figure 22:
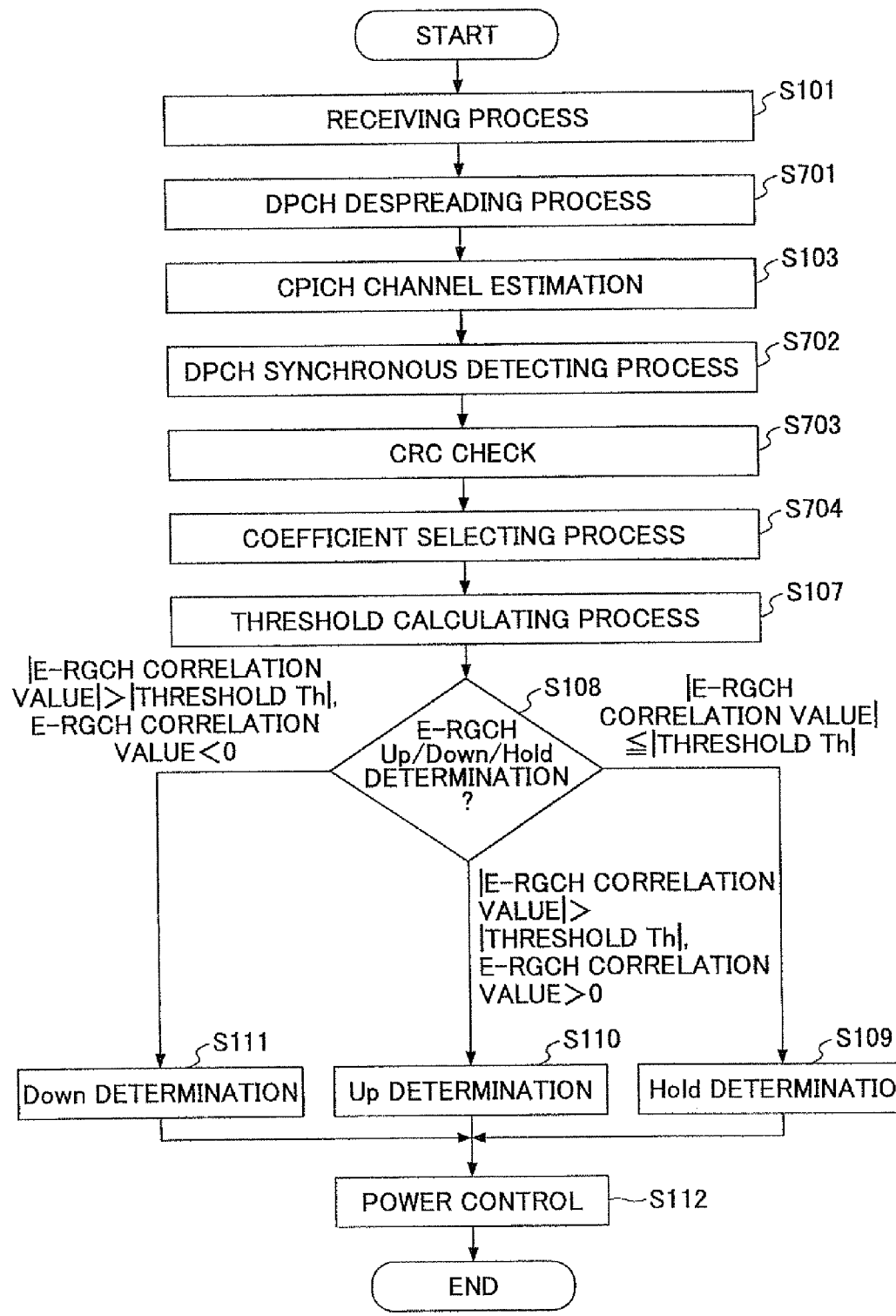
FIG. 22 depicts a flowchart of one example of a transmission power control process using the measurement 6.

FIG. 22 is a flowchart depicting one example of a transmission power control process using the measurement 6. In the process depicted in FIG. 22, the same reference numerals are given to steps the same as those of FIG. 10. In step S701, the DPCH despreading part 711 outputs the DPCH despread value to the DPCH synchronous detecting part 721.

In step S702, the DPCH synchronous detecting part 721 carries out synchronous detection on the DPCH despread value, and outputs the signal obtained from the synchronous detection to the DPCH decoding process part 704.

In step S703, the DPCH decoding process part 704 carries out a decoding process on the DPCH signal, and outputs a BLER obtained from a determination result of CRC determination to the coefficient selecting part 731.

In step S704, the coefficient selecting part 731 selects the coefficient used to calculate the threshold based on the obtained CRC determination result, for example, the BLER. The coefficient selecting part 731 selects the coefficient $\alpha_B$ when the BLER is equal to or more than 0.05, and selects the coefficient $\alpha_A$ when the BLER is less than 0.05, for example. After the coefficient is thus determined, a process carried out after that is the same as the process depicted in FIG. 10.

Thus, by measuring the reception environment based on the error rate of DPCH, it is possible to change the determination threshold for the E-RGCH signal to adapt decoding performance of the terminal.

(Measurement 7)

Figure 23:
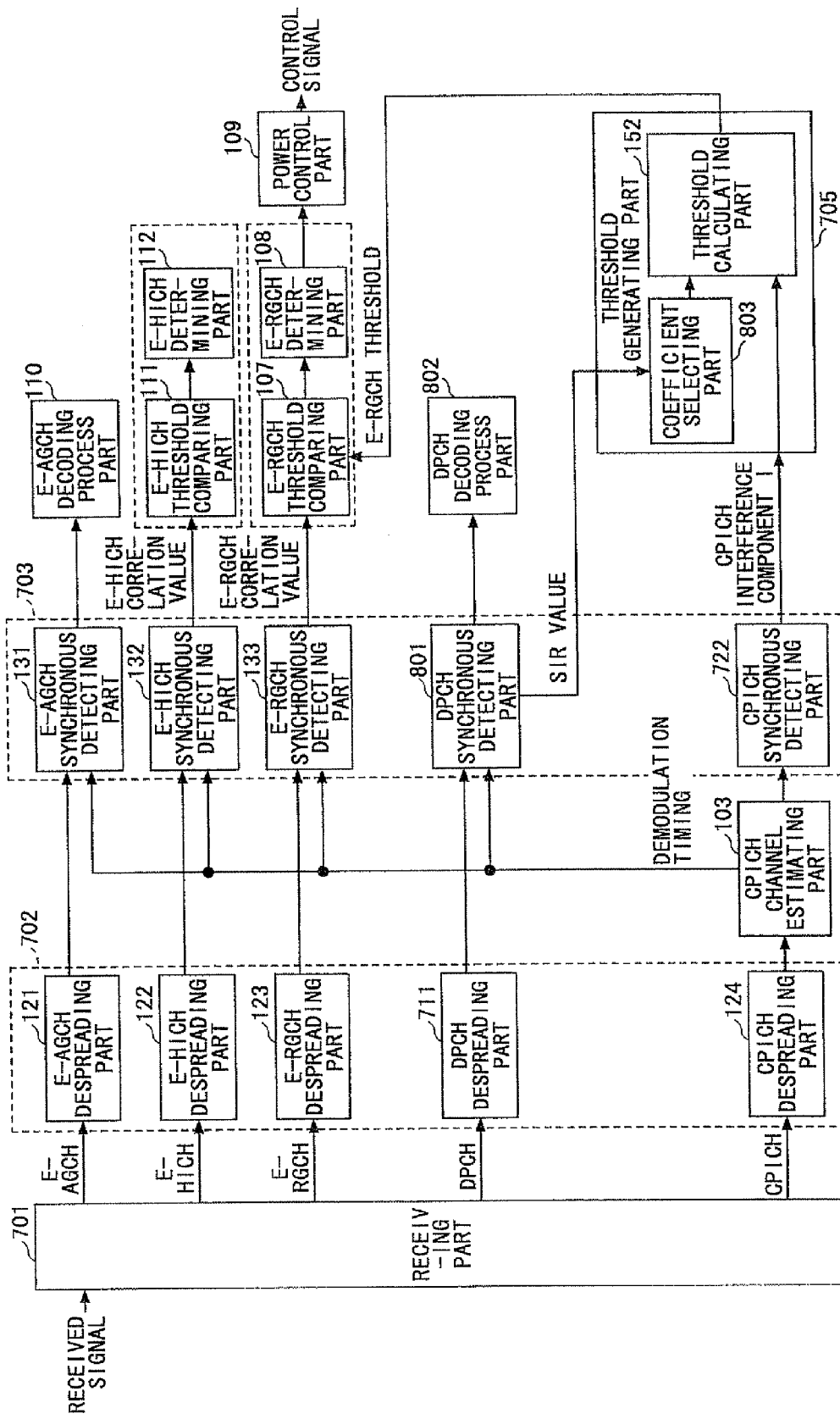
FIG. 23 depicts a block diagram of one example of functions of a mobile terminal using a measurement 7.

FIG. 23 is a block diagram depicting one example of functions of a mobile terminal using the measurement 7. The mobile terminal depicted in FIG. 23 includes a DPCH synchronous detecting part 801, a DPCH decoding process part 802, and a coefficient selecting part 803. The other functions are the same as those depicted in FIG. 21, and the same reference numerals are given thereto. In a case of using the measurement 7, the DPCH synchronous detecting part 801 acts as a measuring part that measures the reception environment.

The DPCH synchronous detecting part 801 obtains a SIR value of a DPDCH (Dedicated Physical Data Channel) signal included in the DPCH signal obtained from the synchronous detection, for example. The DPCH synchronous detecting part 801 outputs the SIR value of the DPDCH signal to the coefficient selecting part 803. The DPCH synchronous detecting part 801 outputs the DPCH signal obtained from the synchronous detection to the DPCH decoding process part 802. The DPCH synchronous detecting part 801 may output the currently calculated SIR value to the coefficient selecting part 803 in a case where a SIR threshold is between the currently calculated SIR value and the previously calculated SIR value. Thereby, the DPCH synchronous detecting part 801 can avoid outputting the SIR value each time when calculating the SIR value.

The DPCH decoding process part 802 carries out a decoding process on the DPCH signal obtained from the synchronous detection. The decoding process includes processes up to and including an error correction process and a CRC determination.

The coefficient selecting part 803 selects a coefficient based on the SIR value of the DPDCH signal obtained from the DPCH synchronous detecting part 801. The coefficient is used to generate the determination threshold for the E-RGCH signal. The coefficient selecting part 803 selects a coefficient $\alpha_A$ when the SIR value is less than 10 dB (SIR threshold), and selects a coefficient $\alpha_B$ when the SIR value is equal to or more than 10 dB, for example. A relationship between $\alpha_A$ and $\alpha_B$ is such that $\alpha_A > \alpha_B$. The coefficient selecting part 803 outputs the selected coefficient $\alpha$ to the threshold calculating part 152. The threshold calculating part 152 obtains the determination threshold Th by multiplying the coefficient $\alpha$ and the CPICH interference component I together, in the same way as that in the case of the measurement 1.

Figure 24:
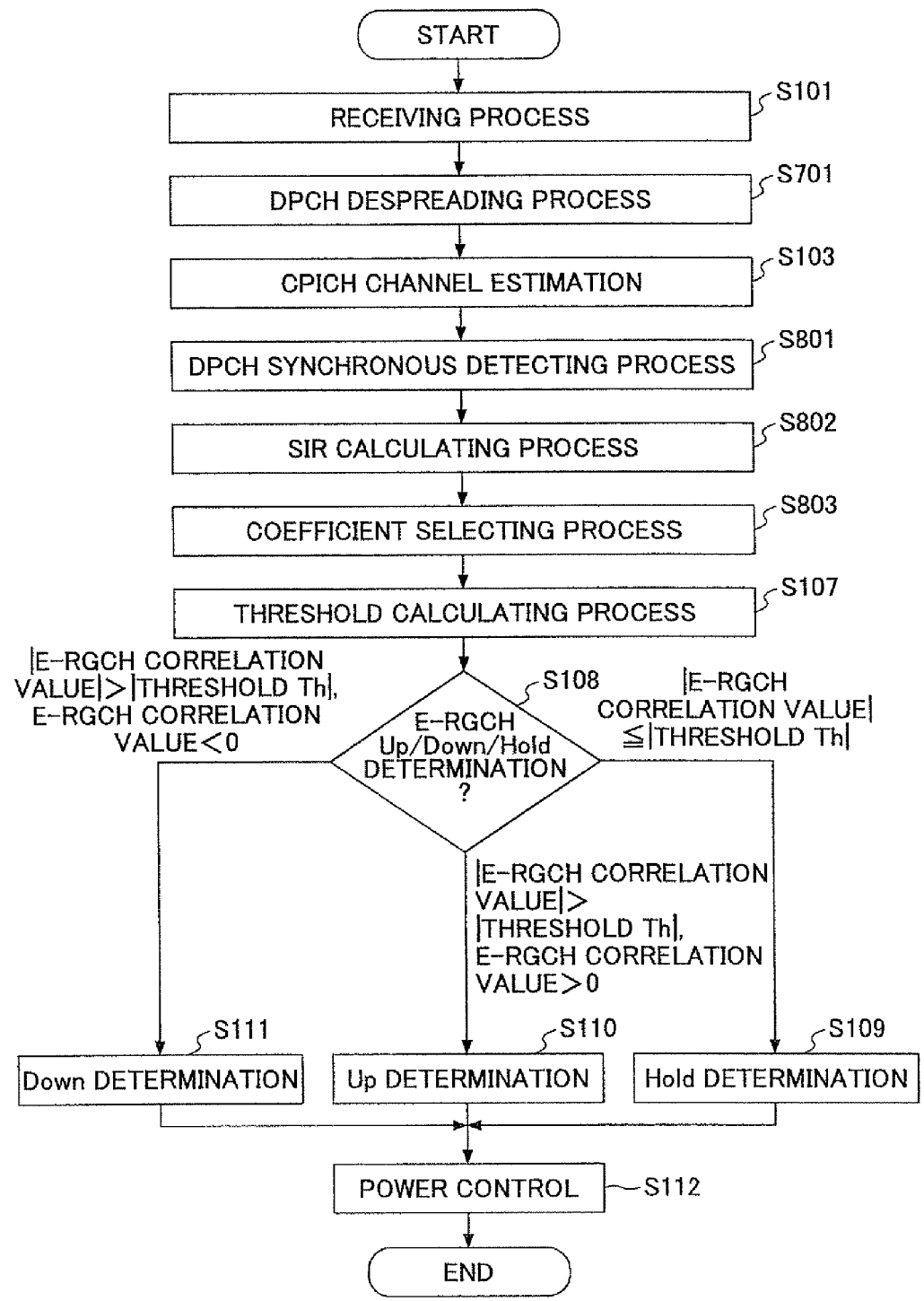
FIG. 24 depicts a flowchart of one example of a transmission power control process using the measurement 7.

FIG. 24 is a flowchart depicting one example of a transmission power control process using the measurement 7. In the process depicted in FIG. 24, the same reference numerals are given to steps the same as those of FIGS. 10 and 22. In step S801, the DPCH synchronous detecting part 801 carries out synchronous detection on the DPCH despread value, and outputs the SIR value of the DPDCH signal to the coefficient selecting part 803.

In step S802, the coefficient selecting part 803 selects the coefficient used to calculate the threshold based on the obtained SIR value. The coefficient selecting part 803 selects the coefficient $\alpha_B$ when the SIR value is equal to or more than 10 dB, and selects the coefficient $\alpha_A$ when the SIR value is less than 10 dB, for example. After the coefficient is thus determined, a process carried out after that is the same as the process depicted in FIG. 10.

Thus, by measuring the reception environment based on the channel quality other than CPICH, it is possible to change the determination threshold for the E-RGCH signal to adapt the receiving performance.

Thus, according to the embodiment 2, it is possible to improve performance of determining the relative grant channel E-RGCH signal component by changing the determination threshold for the E-RGCH signal according to the reception environment measured based on the DPCH signal.

[Embodiment 3]

Next, a mobile terminal in an embodiment 3 of the present invention will be described. according to the embodiment 3, the reception environment is measured based on each channel signal. Below, a measurement 8 in which the reception environment is measured based on each channel signal will be described.

(Measurement 8)

Figure 25:
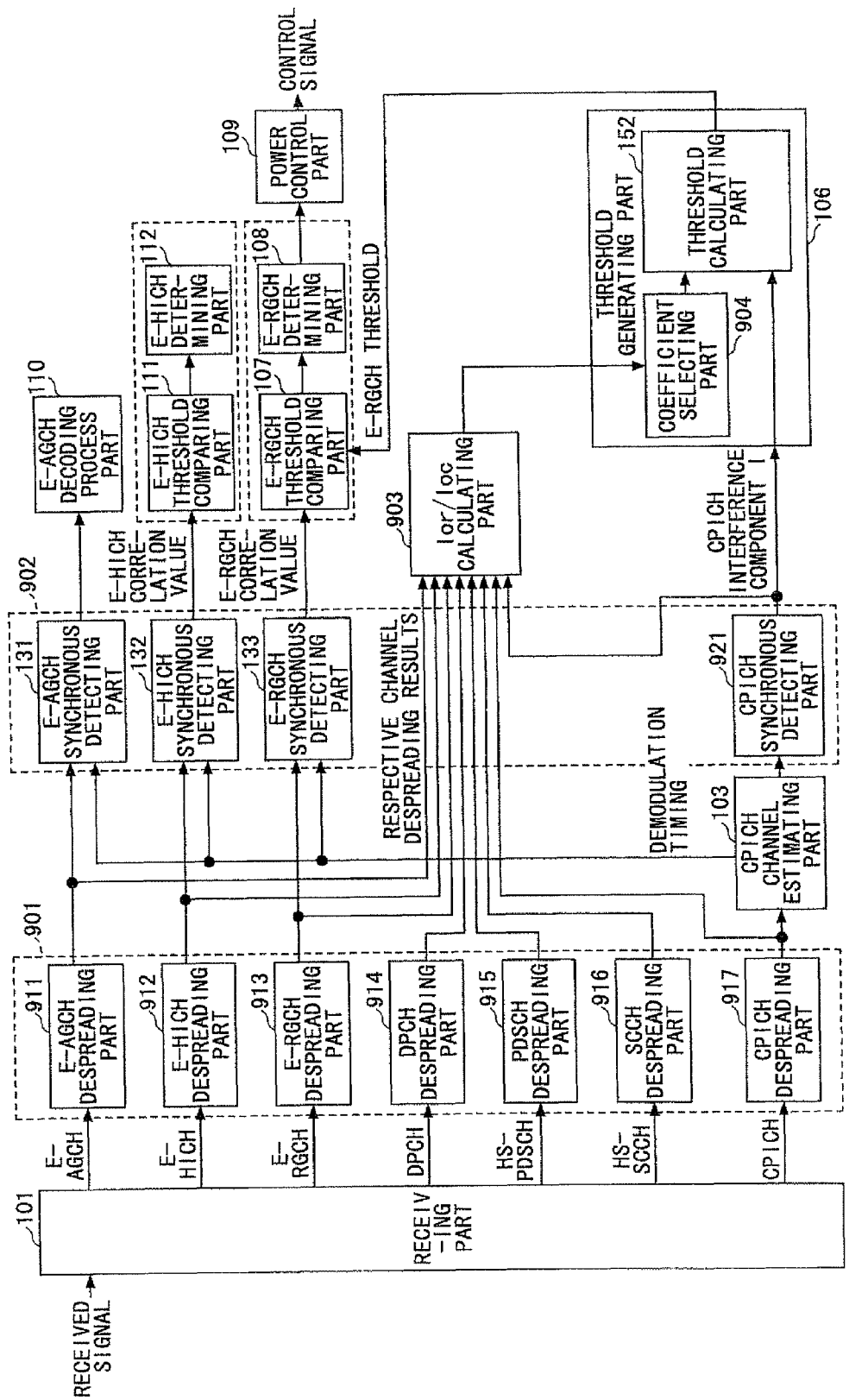
FIG. 25 depicts a block diagram of one example of functions of a mobile terminal using a measurement 8.

FIG. 25 is a block diagram depicting one example of functions of a mobile terminal using the measurement 8. The mobile terminal depicted in FIG. 25 includes a despreading part 901, a synchronous detecting part 902, an Ior/Ioc calculating part 903, and a coefficient selecting part 904. The other functions are the same as those depicted in FIG. 5, and thus, the same reference numerals are given thereto. The Ior/Ioc calculating part 903 acts as a measuring part that measures the reception environment.

The despreading part 901 carries out a despreading process on each channel signal obtained from the receiving part 101. The despreading part 901 includes a E-AGCH despreading part 911, a E-HICH despreading part 912, a E-RGCH despreading part 913, a DPCH despreading part 914, a PDSCH (Physical Downlink Shared Channel) despreading part 915, a SCCH (Shared Control Channel) despreading part 916, and a CPICH despreading part 917. The despreading parts 911 through 917 output respective despread values obtained from despreading to the Ior/Ioc calculating part 903, and the despreading parts 911 through 913 output the respective despread value to the synchronous detecting part 902.

A CPICH synchronous detecting part 921 included in the synchronous detecting part 902 outputs a CPICH interference component I that the CPICH synchronous detecting part 921 calculates after carrying out synchronous detection on the despread value of CPICH, to the threshold calculating part 152 and the Ior/Ioc calculating part 903.

The Ior/Ioc calculating part 903 obtains a signal (Ior) for all the channels from the obtained despread values of the respective channels, and obtains a noise signal (Ioc) from the CPICH interference component I. The Ior/Ioc calculating part 903 calculates a Ior/Ioc value by dividing Ior by Ioc. The calculated Ior/Ioc value is output to the coefficient selecting part 904. The Ior/Ioc calculating part 903 may output the currently calculated Ior/Ioc value to the coefficient selecting part 904 in a case where an Ior/Ioc threshold is between the currently calculated Ior/Ioc value and the previously calculated Ior/Ioc value. Thereby, the Ior/Ioc calculating part 903 can avoid outputting the Ior/Ioc value each time when calculating the Ior/Ioc value.

The coefficient selecting part 904 selects a coefficient based on the Ior/Ioc value obtained from the Ior/Ioc calculating part 903. The coefficient is used to generate the determination threshold for the E-RGCH signal. The coefficient selecting part 904 selects a coefficient $\alpha_A$ when the Ior/Ioc value is less than 10 dB (Ior/Ioc threshold), and selects a coefficient $\alpha_B$ when the Ior/Ioc value is equal to or more than 10 dB, for example. A relationship between $\alpha_A$ and $\alpha_B$ is such that $\alpha_A > \alpha_B$. The coefficient selecting part 904 outputs the selected coefficient $\alpha$ to the threshold calculating part 152. The threshold calculating part 152 obtains the determination threshold Th by multiplying the coefficient $\alpha$ and the CPICH interference component I together, in the same way as that in the case of the measurement 1.

Figure 26:
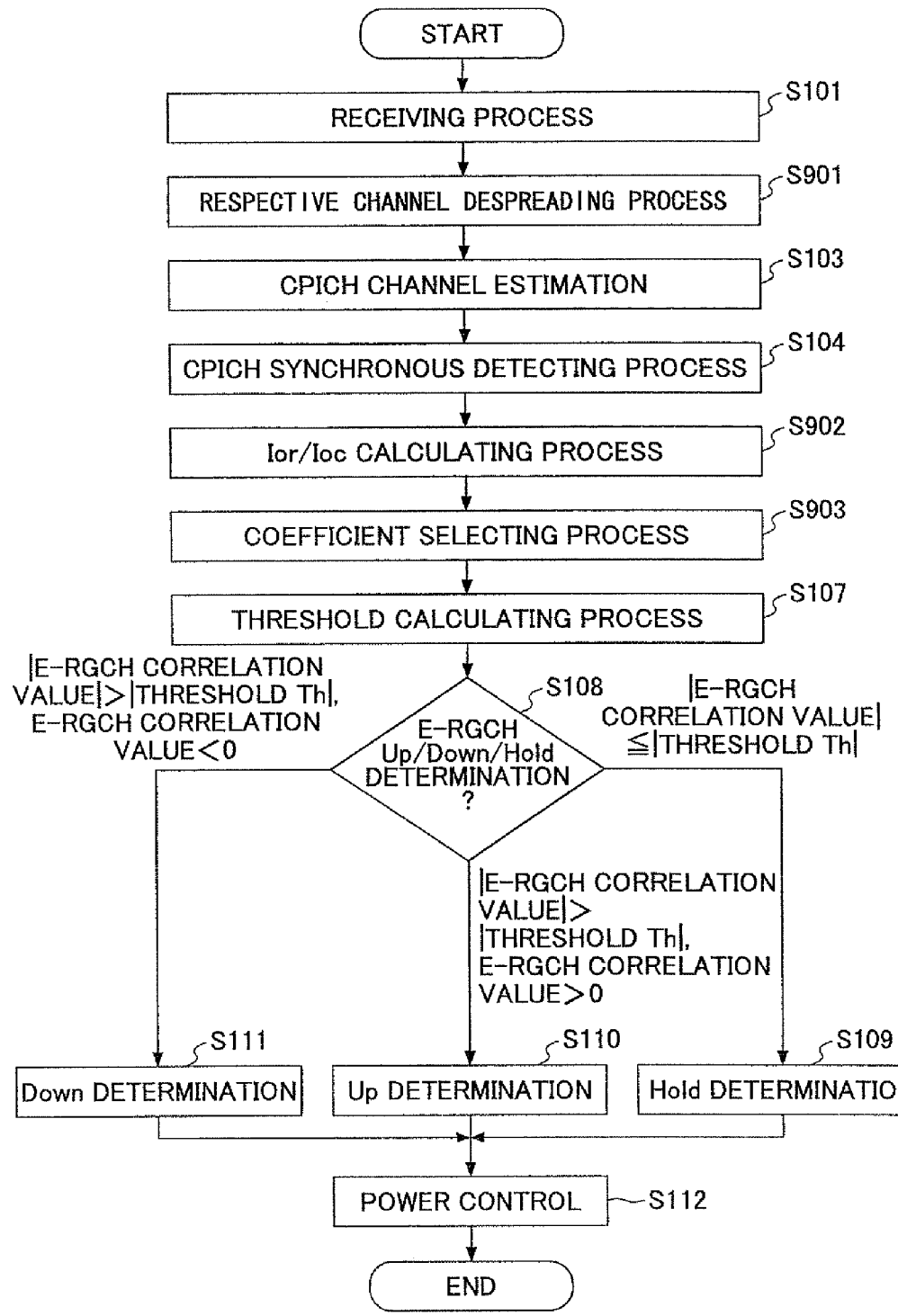
FIG. 26 depicts a flowchart of one example of a transmission power control process using the measurement 9.

FIG. 26 is a flowchart depicting one example of a transmission power control process using the measurement 8. In the process depicted in FIG. 26, the same reference numerals are given to steps the same as those of FIG. 10. In step S901, the despreading part 901 outputs the despread values of the respective channels to the Ior/Ioc calculating part 903.

In step S902, the Ior/Ioc calculating part 903 calculates the Ior/Ioc value by dividing the Ior indicating all of the signals that are transmitted to the mobile terminal by Ioc indicating a signal that is not transmitted to the mobile terminal.

In step S903, the coefficient selecting part 904 selects the coefficient used to calculate the threshold based on the obtained Ior/Ioc value. The coefficient selecting part 904 selects the coefficient $\alpha_B$ when the Ior/Ioc value is equal to or more than 10 dB, and selects the coefficient $\alpha_A$ when the Ior/Ioc value is less than 10 dB, for example. After the coefficient is thus determined, a process carried out after that is the same as the process depicted in FIG. 10.

Thus, by measuring the reception environment based on the Ior/Ioc value considering the received signal component and the interference component, it is possible to change the determination threshold for the E-RGCH signal to adapt the receiving performance.

Thus, according to the embodiment 3, it is possible to improve performance of determining the relative grant channel E-RGCH signal component by changing the determination threshold for the E-RGCH signal according to the reception environment measured based on the respective channel signals.

[Embodiment 4]

Next, a mobile terminal according to an embodiment 4 of the present invention will be described. According to the embodiment 4, the reception environment is measured by a combination of any one of the above-mentioned measurements 1 through 8. Below, an example in which the measurements 1 and 5 are combined will be described.

Figure 27:
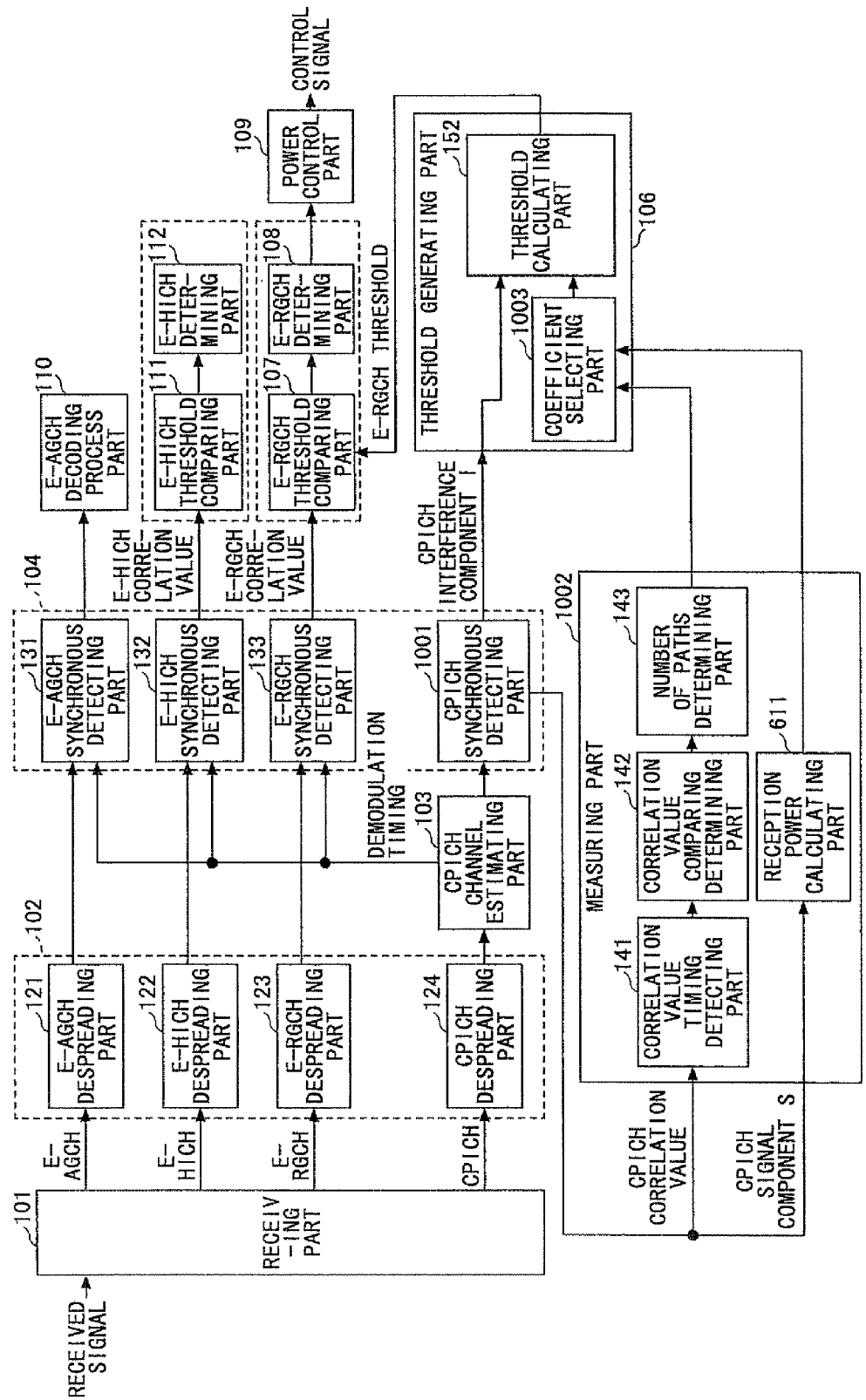
FIG. 27 depicts a block diagram of one example of functions of a mobile terminal in an embodiment 4.

FIG. 27 is a block diagram depicting one example of functions of a mobile terminal in the embodiment 4. The mobile terminal depicted in FIG. 27 includes a CPICH synchronous detecting part 1001, a measuring part 1002, and a coefficient selecting part 1003. The other functions are the same as those depicted in FIGS. 5 and 19, and thus, the same reference numerals are given thereto.

The CPICH synchronous detecting part 1001 outputs a calculated CPICH correlation value and a CPICH signal component S to the measuring part 1002.

As described above for the measurement 1, the measuring part 1002 determines the number of paths by the correlation value timing detecting part 141, the correlation value comparing determining part 142 and the number of paths determining part 143, and outputs the determined number of paths to the coefficient selecting part 1003. As described above for the measurement 5, the measuring part 1002 calculates reception power by the reception power calculating part 611, and outputs the calculated reception power to the coefficient selecting part 1003.

The coefficient selecting part 1003 selects a coefficient based on the number of paths and the reception power obtained from the measuring part 1002. The coefficient is used to generate the determination threshold for the E-RGCH signal. The coefficient selecting part 1003 determines that the reception environment is bad in a case where the number of paths is more than a path threshold (for example, 1), or the reception power is equal to or more than a power threshold (for example, 50 dBm), and selects a coefficient $\alpha_B$. The coefficient selecting part 1003 determines that the reception environment is good in a case where the number of paths is equal to or less than the path threshold and also the reception power is less than the power threshold, and selects a coefficient $\alpha_A$. The coefficient selecting part 1003 outputs the selected coefficient $\alpha$ to the threshold calculating part 152. The threshold calculating part 152 obtains the determination threshold Th by multiplying the coefficient $\alpha$ and the CPICH interference component I together, in the same way as that in the case of the measurement 1.

Figure 28:
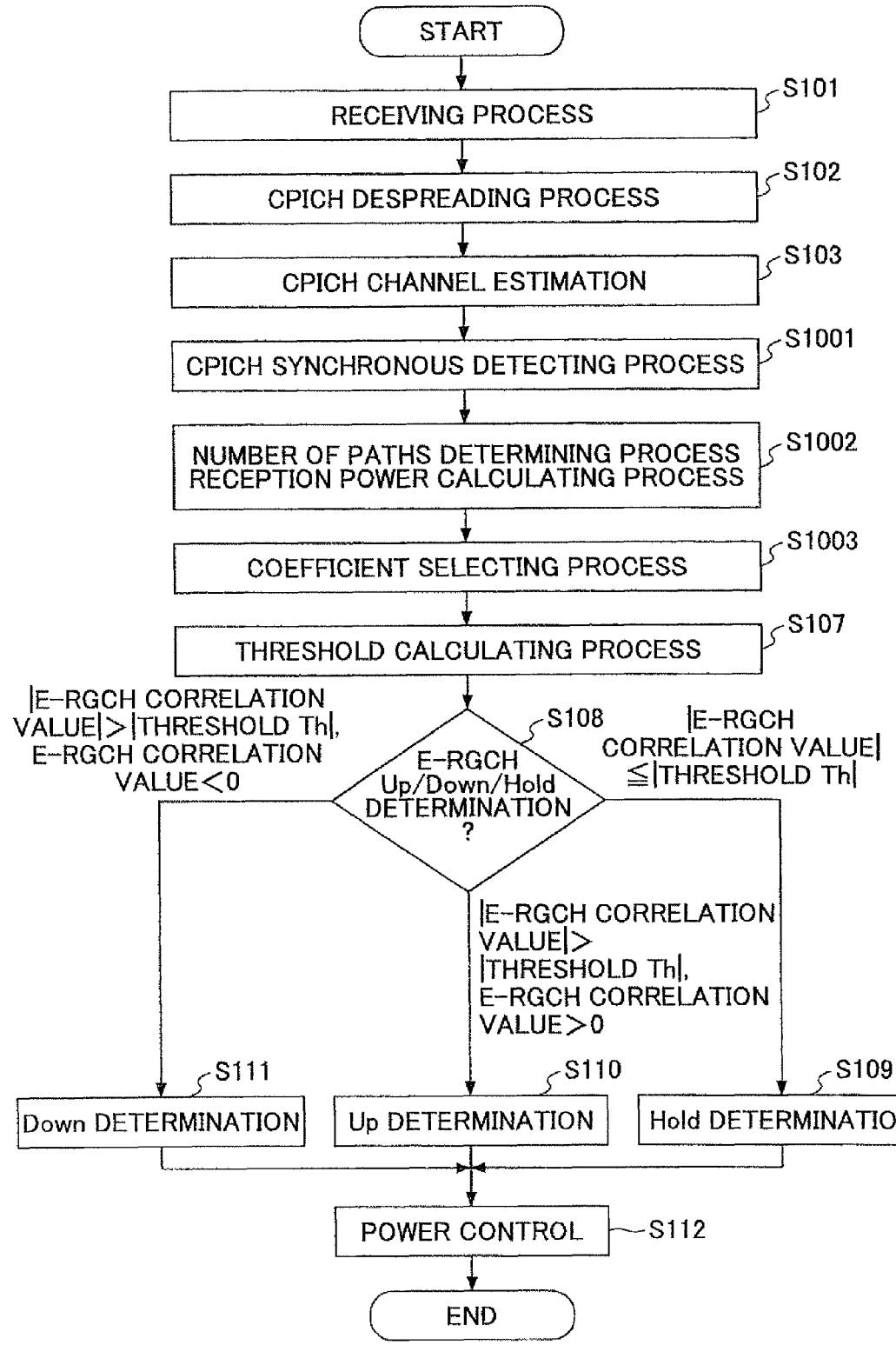
FIG. 28 depicts a flowchart of one example of a transmission power control process in the embodiment 4.

FIG. 28 is a flowchart depicting one example of a transmission power control process according to the embodiment 4. In the process depicted in FIG. 28, the same reference numerals are given to steps the same as those of FIG. 10. In step S1001, the CPICH synchronous detecting part 1001 outputs the calculated CPICH correlation value and CPICH signal component S to the measuring part 1002.

In step S1002, the measuring part 1002 determines the number of paths based on the CPICH correlation value. Further, the measuring part 1002 calculates the reception power based on the CPICH signal component S. The number of paths and the reception power are output to the coefficient selecting part 1003.

In step S1003, the coefficient selecting part 1003 selects the coefficient used to calculate the threshold based on the obtained number of paths and reception power. The coefficient selecting part 1003 determines that the reception environment is good when the number of paths is equal to or less than the path threshold and also the reception power is less than the power threshold, and selects the coefficient $\alpha_A$. Otherwise, the coefficient selecting part 1003 determines that the reception environment is bad, and selects the coefficient $\alpha_B$. After the coefficient is thus determined, a process carried out after that is the same as the process depicted in FIG. 10.

Thus, by combining, for example, two measuring methods, it is possible to limit a condition of determining that the reception environment is good, and thus, it is possible to reduce erroneous determinations of the E-RGCH signal in comparison to a case where one measuring method is used. Thus, it is possible to avoid an increase in erroneous determinations otherwise occurring because the determination threshold increases in a case where the reception environment is erroneously determined good although the reception environment is actually bad.

In the embodiment 4, the measurement 1 and the measurement 5 are combined. Also other measurements may be combined, and the coefficient selecting part 1003 may determine that the reception environment is good and select the coefficient $\alpha_A$ in a case where it is determined that the reception environment is good in every one of the combined measurements.

Thus, according to the embodiment 4, it is possible to improve performance of determining the relative grant channel E-RGCH signal component by changing the determination threshold for the E-RGCH signal according to the reception environment measured in any combination of the respective measuring methods of measuring the reception environment.

Next, a variant embodiment of each of the above-mentioned embodiments 1-4 will be described. It is possible to prepare a computer program for causing a mobile terminal to carry out the transmission power control process according to any one of the above-mentioned embodiments 1-4, install the program in the mobile terminal, and cause the mobile terminal to carry out the transmission power control process by causing the mobile terminal to execute the computer program.

Further, the computer program may be transmitted to a mobile terminal via the Internet, the mobile terminal that receives the computer program may install the computer program in the mobile terminal and carry out the above-mentioned transmission power control process by executing the computer program. In each of the above-mentioned embodiments 1-4, the number of coefficients $\alpha$ is two. However, the number of coefficients $\alpha$ may be equal to or more than three. In this case, the reception environment may be classified and measurement may be carried out, as described above for the measurement 1 (classifying a state of multiple paths). For each embodiment, the method of selecting the coefficient $\alpha$ has been described. However, each threshold generating part may generate or select the determination threshold by using a table in which indexes of the reception environments and the determination thresholds are associated with each other, as described above for the measurement 1 with reference to FIG. 7.

Further, for the above-mentioned embodiments 1-4, description has been made for HSUPA communication as an example. The embodiments 1-4 may be applied to any other communication scheme as long as the communication scheme uses a control signal for controlling transmission power of a mobile terminal such as the E-RGCH signal.

Thus, in the embodiments 1-4, it is possible to improve performance of determining the control signal that is used for controlling transmission power.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present inventions have been described in detail, it should be understood that various changes, substitutions, and alterations could be made hereto without departing from the spirit and scope of the invention.

What is claimed is:

1. A mobile terminal comprising:
    a receiving part configured to receive from a base station a reception signal including a control signal indicative of control for uplink transmission power;
    a threshold generating part configured to change, according to a reception environment, a threshold used for comparing with a correlation value that is obtained from the control signal and a first unique signal;
    a comparing part configured to compare the correlation value with the threshold; and
    a control part configured to control the uplink transmission power based on a comparison result of the comparing part.

2. The mobile terminal as claimed in claim 1, further comprising:
    a measuring part configured to measure the reception environment of the mobile terminal based on a predetermined signal included in the reception signal, wherein:
    the threshold generating part generates the threshold according to the measured reception environment.

3. The mobile terminal as claimed in claim 2, wherein:
    the threshold includes a first threshold used to determine an increase and holding, and a second threshold used to determine a decrease and holding, and
    the threshold generating part generates the first threshold and the second threshold according to the reception environment.

4. The mobile terminal as claimed in claim 2, wherein:
    the reception signal includes a common pilot channel signal, and
    the measuring part determines the reception environment based on a correlation value between the common pilot channel signal and a second unique signal.

5. The mobile terminal as claimed in claim 4, wherein:
    the measuring part determines a number of paths based on the correlation value of the common pilot channel signal, and
    the threshold generating part includes:
    a selecting part configured to select a coefficient based on a determined number of paths; and
    a threshold calculating part configured to calculate the threshold by multiplying an interference component of the common pilot channel signal by the selected coefficient.

6. The mobile terminal as claimed in claim 5, further comprising:
    a synchronous detecting part configured to carry out synchronous detection on the control signal for the determined number of paths.

7. The mobile terminal as claimed in claim 2, wherein:
    the reception signal includes a common pilot channel signal,
    the measuring part includes a power calculating part configured to calculate, from the common pilot channel signal, reception power of the common pilot channel signal, and
    the threshold generating part includes
    a selecting part configured to select a coefficient based on the calculated reception power; and
    a threshold calculating part configured to calculate the threshold by multiplying an interference component of the common pilot channel signal by the selected coefficient.

8. The mobile terminal as claimed in claim 2, wherein:
    the measuring part has plural methods of measuring the reception environment, and
    the threshold generating part generates the threshold according to plural measurement results of the reception environment obtained from the plural methods of measuring the reception environment.

9. The mobile terminal as claimed in claim 8, wherein:
    the reception signal includes a common pilot channel signal, the measuring part includes:
    a number of paths determining part configured to determine a number of paths based on a correlation value of the common pilot signal; and a power calculating part configured to calculate, from the common pilot channel signal, reception power of the common channel pilot signal, and the threshold generating part generates the threshold based on the determined number of paths and the calculated reception power.

10. The mobile terminal as claimed in claim 2, wherein:

the reception signal includes a common pilot channel signal, the measuring part includes a number of paths determining part configured to determine a number of paths based on a correlation value of the common pilot channel signal; and a power calculating part configured to calculate, from the common pilot channel signal, reception power of the common channel pilot signal, and the threshold generating part generates the threshold based on the determined number of paths and the calculated reception power.

11. The mobile terminal as claimed in claim 2, wherein:

the reception signal includes a common pilot channel signal, the measuring part includes a speed determining part configured to determine a fading speed from a channel estimated value of the common pilot channel signal, and the threshold generating part includes a selecting part configured to select a coefficient according to the determined fading speed; and a threshold calculating part configured to calculate the threshold by multiplying an interference component of the common pilot channel signal by the selected coefficient.

12. The mobile terminal as claimed in claim 2, wherein:

the reception signal includes a common pilot channel signal, the measuring part includes a quality calculating part configured to calculate reception quality of the common pilot channel signal, and the threshold generating part includes a selecting part configured to select a coefficient according to the calculated reception quality; and a threshold calculating part configured to calculate the threshold by multiplying an interference component of the common pilot channel signal by the selected coefficient.

13. The mobile terminal as claimed in claim 2, wherein:

the reception signal includes an individual physical channel, and the threshold generating part generates the threshold based on a CRC calculation result or a signal-to-interference-ratio calculation result of an individual physical data channel signal included in the individual physical channel.

14. The mobile terminal as claimed in claim 2, wherein the threshold generating part includes a calculating part configured to calculate an Ior/Ioc value based on despread values of respective channel signals included in the reception signal and an interference component of a common pilot channel signal;

a selecting part configured to select a coefficient according to the calculated Ior/Ioc value; and a threshold calculating part configured to calculate the threshold by multiplying the interference component of the common pilot channel signal by the selected coefficient.

15. The mobile terminal as claimed in claim 1, wherein:

uplink transmission from the mobile terminal to a base station is carried out in HSUPA (High Speed Uplink Packet Access) communication.

16. The mobile terminal as claimed in claim 1, wherein:

the first unique signal is a signature pattern unique to the reception signal.

17. A power control method in a mobile terminal, comprising:

receiving, from a base station, a reception signal including a control signal indicative of control for uplink transmission power;

changing, according to a reception environment, a threshold used for comparing with a correlation value that is obtained from the control signal and a first unique signal;

comparing the correlation value with the threshold; and controlling the uplink transmission power based on a comparison result.

18. The power control method as claimed in claim 17, wherein:

the first unique signal is a signature pattern unique to the reception signal.

19. A power control method in a communication system which comprises a base station and a mobile terminal, comprising:

in the base station:

transmitting a first signal including a control signal indicative of control for uplink transmission power of the mobile terminal; and in the mobile terminal:

receiving the first signal from the base station;

changing, according to a reception environment, a threshold used for comparing with a correlation value that is obtained from the control signal included in the first signal and a first unique signal;

comparing the correlation value with the threshold; and controlling the uplink transmission power based on a comparison result.

* * * * *